US012585259B2

(12) United States Patent
Tashiro et al.

(10) Patent No.: US 12,585,259 B2
(45) Date of Patent: Mar. 24, 2026

(54) PROCESS MANAGEMENT DEVICE FOR VISUALIZING PRODUCTION STATUS

(71) Applicant: Mitsubishi Electric Corporation, Tokyo (JP)

(72) Inventors: Hideaki Tashiro, Tokyo (JP); Yoshiki Nakayama, Tokyo (JP); Hidematsu Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 462 days.

(21) Appl. No.: 18/265,713

(22) PCT Filed: Mar. 17, 2021

(86) PCT No.: PCT/JP2021/010744
§ 371 (c)(1),
(2) Date: Jun. 7, 2023

(87) PCT Pub. No.: WO2022/195748
PCT Pub. Date: Sep. 22, 2022

(65) Prior Publication Data
US 2024/0036559 A1 Feb. 1, 2024

(51) Int. Cl.
*G05B 19/418* (2006.01)
(52) U.S. Cl.
CPC ................. *G05B 19/41865* (2013.01); *G05B 2219/45054* (2013.01)
(58) Field of Classification Search
None
See application file for complete search history.

(56) References Cited

U.S. PATENT DOCUMENTS 10,540,626 B2 * 1/2020 Takahashi ............. G06T 11/206
12,147,921 B2 * 11/2024 Gottschalk ....... G05B 19/41865
(Continued)

FOREIGN PATENT DOCUMENTS

JP 2001-034672 A 2/2001
JP 2002-055710 A 2/2002
(Continued)

OTHER PUBLICATIONS

International Search Report and Written Opinion mailed on Jun. 8, 2021, received for PCT Application PCT/JP2021/010744, filed on Mar. 17, 2021, 9 pages including English Translation.

*Primary Examiner* — Ariel Mercado-Vargas
(74) *Attorney, Agent, or Firm* — XSENSUS LLP

(57) ABSTRACT

A process management device includes: a data input unit to input acquired information including operation data of a production facility as well as request instruction information; a control unit to output first display data of the work process management chart which includes work time lines showing work times by length and conveyance time lines showing conveyance times by inclination, both lines being arranged on the process management chart on the basis of the operation data, and serves as display data of the work process management chart, and when requested, to output second display data of the work process management chart obtained by visualizing the production status visualized by the first display data with a representation method of the work process management chart different from that of the work process management chart displayed based on the first display data; and a display unit to display the display data for outputting.

9 Claims, 22 Drawing Sheets

(56)     References Cited

U.S. PATENT DOCUMENTS

| | | | |
|---|---|---|---|
| 2006/0212323 A1* | 9/2006 | Ninomiya | G06Q 10/087 705/7.29 |
| 2012/0158167 A1* | 6/2012 | Lengyel | G06Q 50/04 700/101 |
| 2012/0242648 A1* | 9/2012 | Baier | G05B 19/409 345/418 |
| 2012/0290879 A1* | 11/2012 | Shibuya | G05B 23/021 714/26 |
| 2015/0268994 A1* | 9/2015 | Okabayashi | G06F 9/4843 718/103 |
| 2016/0274552 A1* | 9/2016 | Strohmenger | G06Q 10/06 |
| 2018/0191988 A1 | 7/2018 | Takahashi et al. | |
| 2018/0356282 A1* | 12/2018 | Fukuda | G05B 19/4065 |
| 2018/0356804 A1* | 12/2018 | Oka | G05B 19/418 |
| 2020/0130246 A1* | 4/2020 | Horiuchi | G06N 3/09 |
| 2021/0182762 A1* | 6/2021 | Suginishi | G06Q 10/0633 |
| 2022/0026888 A1* | 1/2022 | Kimura | G06T 11/206 |
| 2022/0026897 A1* | 1/2022 | Kimura | G05B 23/0294 |
| 2022/0404816 A1* | 12/2022 | Takeuchi | G06F 3/0484 |
| 2024/0210927 A1* | 6/2024 | Chiba | G05B 19/418 |

FOREIGN PATENT DOCUMENTS

| | | |
|---|---|---|
| JP | 2011-181058 A | 9/2011 |
| JP | 2016-184235 A | 10/2016 |
| JP | 2018-041436 A | 3/2018 |
| JP | 2019-053665 A | 4/2019 |
| JP | 2019-053666 A | 4/2019 |
| WO | 2017/056263 A1 | 4/2017 |

* cited by examiner

FIG. 3

| Product number | Work Process 1 | | Work Process 2 | | Work Process 3 | | Work Process 4 | |
|---|---|---|---|---|---|---|---|---|
| | Work start time | Work end time | Work start time | Work end time | Work start time | Work end time | Work start time | Work end time |
| SN0001 | 08:00:00 | 08:10:00 | 08:15:00 | 08:20:00 | 08:25:00 | 08:35:00 | 08:40:00 | 08:50:00 |
| SN0002 | 08:15:00 | 08:25:00 | 08:30:00 | 08:35:00 | 08:40:00 | 08:50:00 | 09:10:00 | 09:20:00 |
| SN0003 | 08:30:00 | 08:40:00 | 08:45:00 | 08:50:00 | 08:55:00 | 09:20:00 | 09:25:00 | 09:35:00 |
| SN0004 | 08:45:00 | 08:55:00 | 09:00:00 | 09:05:00 | 09:25:00 | 09:35:00 | 09:40:00 | 09:50:00 |
| SN0005 | 09:00:00 | 09:10:00 | 09:15:00 | 09:20:00 | 09:40:00 | 09:50:00 | 09:55:00 | 10:05:00 |
| . . . | . . . | . . . | . . . | . . . | . . . | . . . | . . . | . . . |

FIG. 13

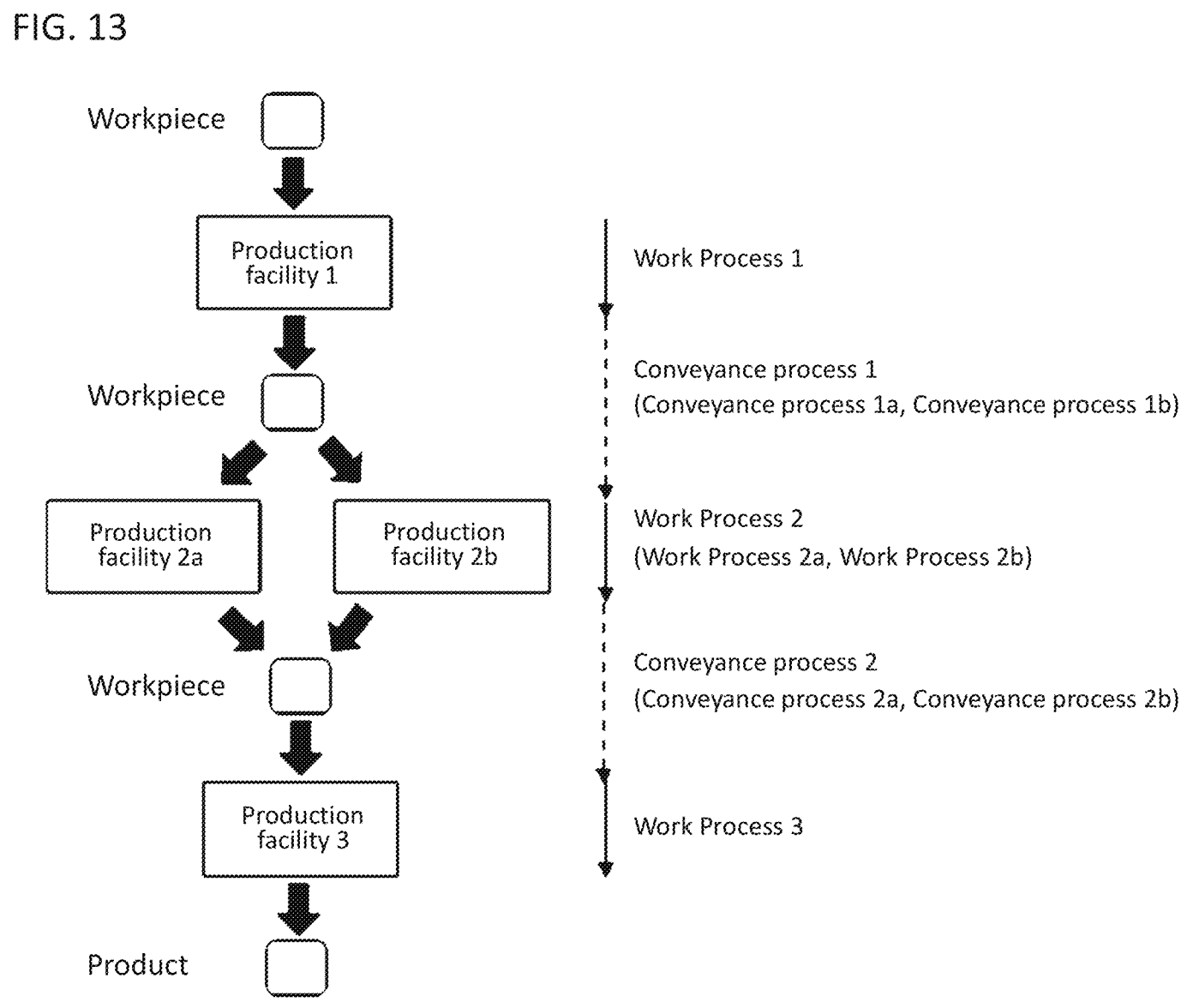

Work Process 1

Conveyance process 1
(Conveyance process 1a, Conveyance process 1b)

Work Process 2
(Work Process 2a, Work Process 2b)

Conveyance process 2
(Conveyance process 2a, Conveyance process 2b)

Work Process 3

Workpiece

Production facility 1

Workpiece

Production facility 2b

Production facility 2a

Workpiece

Production facility 3

Product

FIG. 19

| Product number | Work Process 1 | | Work Process 2 | | Work Process 3 | | Product type information |
| | Work start time | Work end time | Work start time | Work end time | Work start time | Work end time | |
| --- | --- | --- | --- | --- | --- | --- | --- |
| SN0001 | 08:00:00 | 08:10:00 | 08:15:00 | 08:20:00 | 08:25:00 | 08:35:00 | Product type A |
| SN0002 | 08:15:00 | 08:25:00 | 08:30:00 | 08:35:00 | 08:40:00 | 08:50:00 | Product type A |
| SN0003 | 08:45:00 | 08:50:00 | 08:55:00 | 09:00:00 | 09:05:00 | 09:10:00 | Product type B |
| SN0004 | 08:55:00 | 09:00:00 | 09:05:00 | 09:10:00 | 09:15:00 | 09:20:00 | Product type B |
| SN0005 | 09:15:00 | 09:25:00 | 09:20:00 | 09:30:00 | 09:35:00 | 09:45:00 | Product type C |
| ··· | ··· | ··· | ··· | ··· | ··· | ··· | ··· |

PROCESS MANAGEMENT DEVICE FOR VISUALIZING PRODUCTION STATUS

CROSS-REFERENCE TO RELATED APPLICATION

The present application is based on PCT filing PCT/JP2021/010744, filed Mar. 17, 2021, the entire contents of which is incorporated herein by reference.

TECHNICAL FIELD

The present disclosure relates to a process management device that can visually represent a production status of a plurality of products manufactured by multiple work processes.

BACKGROUND ART

In conventional product manufacturing, when a product is manufactured by multiple work processes, a work time for each work process is managed on the basis of the difference between a work start time and a work end time, thereby improving a work process that prevents productivity improvement. For example, Patent Document 1 discloses a process management device that manages multiple work processes using a Gantt chart visually representing a production status. This process management device enables visual recognition of a work time and a production waiting time in each of the multiple work processes by displaying each work process with a Gantt chart that represents the work process in a rectangular area with the work start time as a starting edge and the work end time as a finishing edge, thereby facilitating figuring out a work process that prevents productivity improvement.

PRIOR ART DOCUMENTS

Patent Document

[Patent Document 1] Japanese Unexamined Patent Application Publication No. 2011-181058

SUMMARY OF THE INVENTION

Problems to be Solved by the Invention

Unfortunately, however, in the Gantt chart used in Patent Document 1, adjustment to a user-friendly representation method in accordance with the circumstances of the moment and display by the adjusted method is difficult because the representation method is uniformly limited. As for the representation method, for example, one may want to adjust the representation method to match a restriction to the display area in which the Gantt chart can be displayed. Also, a manager may want to change the representation method to a representation method that is more useful for the production management. As in these examples, the required representation methods cannot be uniform, depending on the circumstances at the time.

The present disclosure, devised in view of the above, aims to obtain a process management device that can flexibly represent a production status in each work process in accordance with the manager's request.

Means for Solving Problem

In order to solve the above-mentioned problem and achieve the objective, the process management device according to the present disclosure that visualizes a production status of a plurality of product pieces being manufactured through multiple work processes using a work process management chart of a two-dimensional coordinate system including a time axis representing work time in each work process and a process axis representing transition of the work processes, the process management device includes: a data input unit to input various acquired information including operation data of a production facility corresponding to each of the work processes as well as request instruction information from a manager; a control unit to output, as display data for outputting, first display data being the display data of the work process management chart which includes work time lines showing work times in each of the work processes by length and conveyance time lines showing conveyance times in each conveyance process by inclination, both lines being arranged on the process management chart on the basis of the operation data, and serves as display data of the work process management chart to be used for reference, and when the request instruction information for the first display data is inputted from the data input unit, to output, as the display data for outputting, second display data being display data of the work process management chart obtained by visualizing the production status visualized by the first display data, on the basis of the request instruction information, with a representation method of the work process management chart different from the representation method of the work process management chart displayed based on the first display data; and a display unit to display the display data for outputting.

Effects of the Invention

The process management device according to the present disclosure is effective in that it can flexibly represent a production status in each work process in accordance with the manager's request.

BRIEF DESCRIPTION OF THE DRAWINGS

FIG. 3 shows an example of a data structure of a database stored in a storage unit according to Embodiment 1.

FIG. 13 shows an example of a manufacturing process according to Embodiment 2.

FIG. 19 shows an example of operation data used by the process management device according to Embodiment 4.

EMBODIMENTS FOR CARRYING OUT THE INVENTION

Hereinafter, the process management devices according to the embodiments of the present disclosure will be described in detail on the basis of the drawings. Note that these embodiments are not to limit the present disclosure.

Embodiment 1

Figure 1:
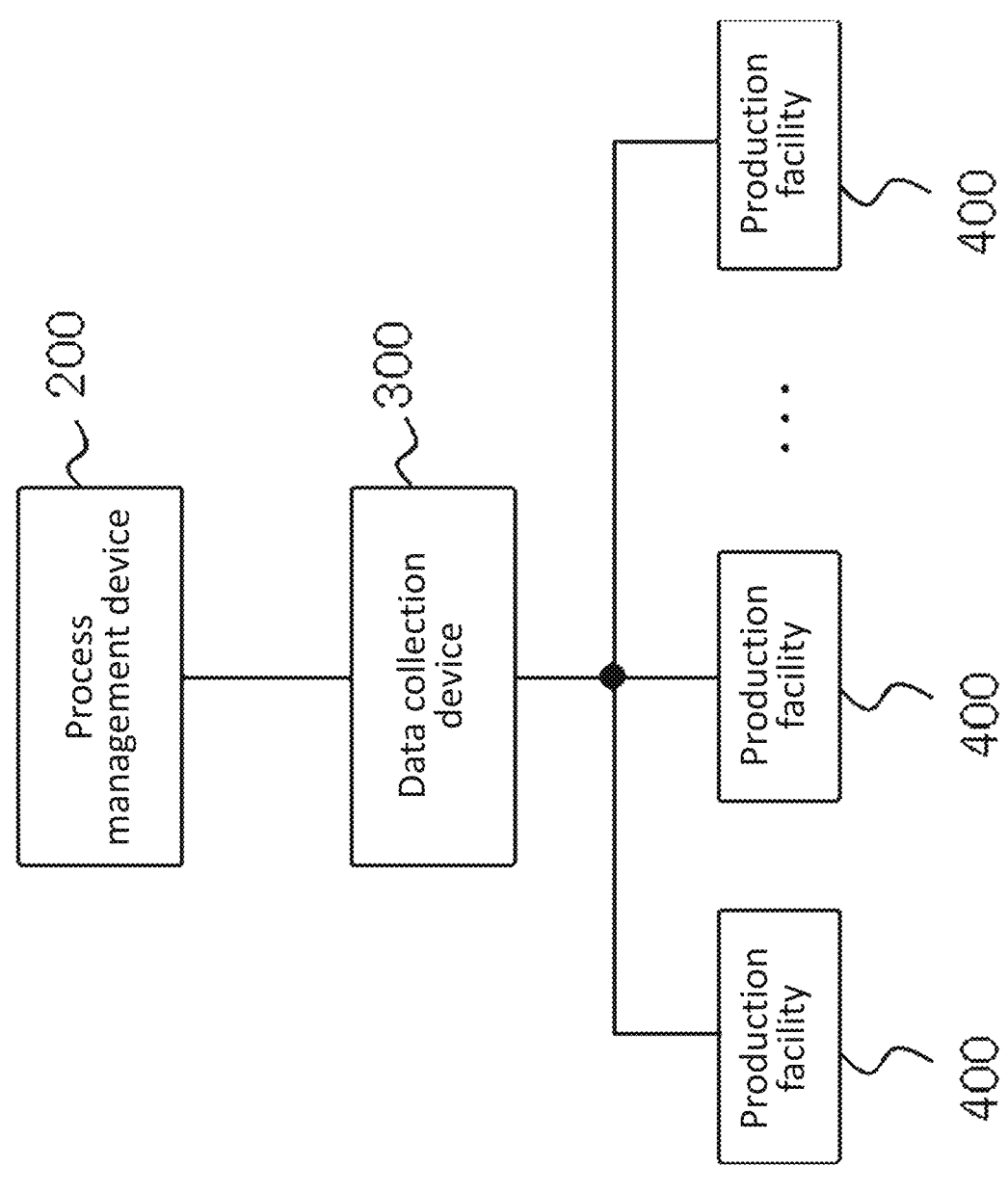
FIG. 1 shows an overall configuration of a process management system including a process management device according to Embodiment 1.

FIG. 1 shows an overall configuration of a process management system including a process management device according to Embodiment 1 of the present disclosure. The process management system includes a data collection device 300, a process management device 200, and a plurality of production facilities 400. A manufacturing process of one product is configured by combining multiple work processes, and each work process is performed by a corresponding production facility 400. In manufacturing of products, the data collection device 300 collects operation data from each of the production facilities 400 that perform the respective work processes and sends the collected operation data to the process management device 200. In the present embodiment, the operation data represents, as an example, a work start time, which is the time when production of each product in each work process is started by the production facility 400 corresponding to the work process and a work end time, which is the time when the production of the product in the work process is ended by the production facility 400. However, the operation data is not limited to these but may include other data that can be used for production control. That is, the work start time is the time when processing is started for each product in each work process; the work end time is the time when processing is ended for each product in each work process. The process management device 200 displays display data obtained by processing the acquired operation data in accordance with a specific representation method.

Figure 2:
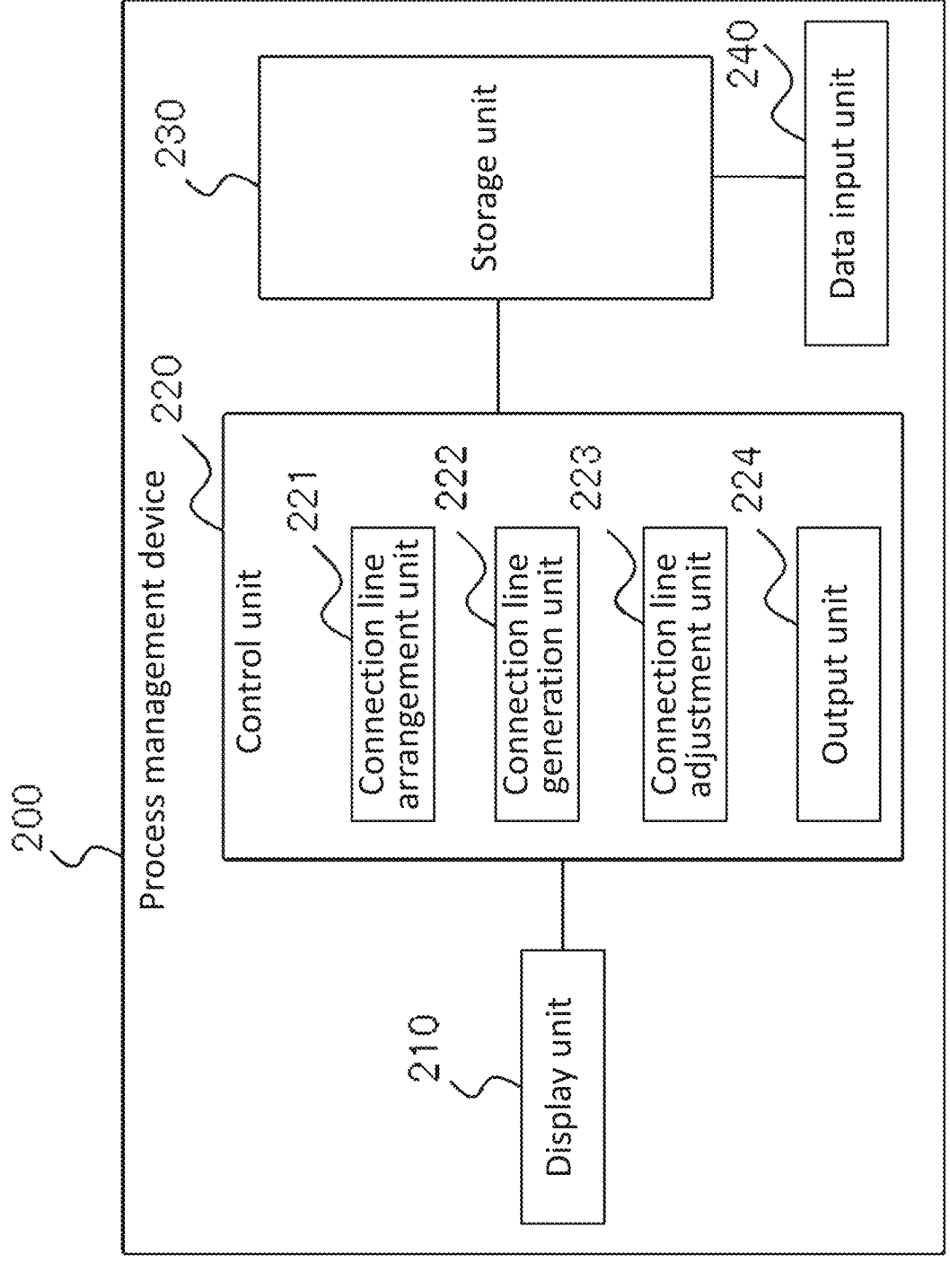
FIG. 2 shows a configuration of the process management device according to Embodiment 1.

FIG. 2 shows a configuration of the process management device 200 shown in FIG. 1. The process management device 200 includes a control unit 220, a storage unit 230, a data input unit 240, and a display unit 210. The data input unit 240 inputs various acquired information including the operation data of the production facilities 400 collected by the data collection device 300, request instruction information from the manager, and various setting information, to store them in the storage unit 230, wherein the production facilities 400 each correspond to one of the work processes. The storage unit 230 stores various information necessary for processes of visualizing the production status of the products being manufactured by the multiple work processes, including the various acquired information. For example, the storage unit 230 stores the operation data and manages the operation data for each work process and for each product number in a database format. The storage unit 230 also stores information such as the setting information including formats of connection lines as represented by work time lines and conveyance time lines, to be described later, and the manager's request instruction information. The control unit 220 is a unit that performs control necessary for the process of visualizing the production status of a product in each of the work processes. The control unit 220 acquires the operation data from the storage unit 230 and outputs the display data, obtained by processing the acquired operation data so as to be able visualize the production status, to the display unit 210 as display data for outputting a work process management chart. The control unit 220 includes a connection line arrangement unit 221, a connection line generation unit 222, a connection line adjustment unit 223, and an output unit 224. The display unit 210 displays the display data for outputting the work process management chart.

The work process management chart is a diagram used to manage the production status of the products being manufactured by the multiple work processes. In the chart, the operation data is represented visually to facilitate the assessment of the production status. Therefore, the manager can easily access the production status just by looking at the work process management chart. The work process management chart will be described in detail later.

Figure 4:
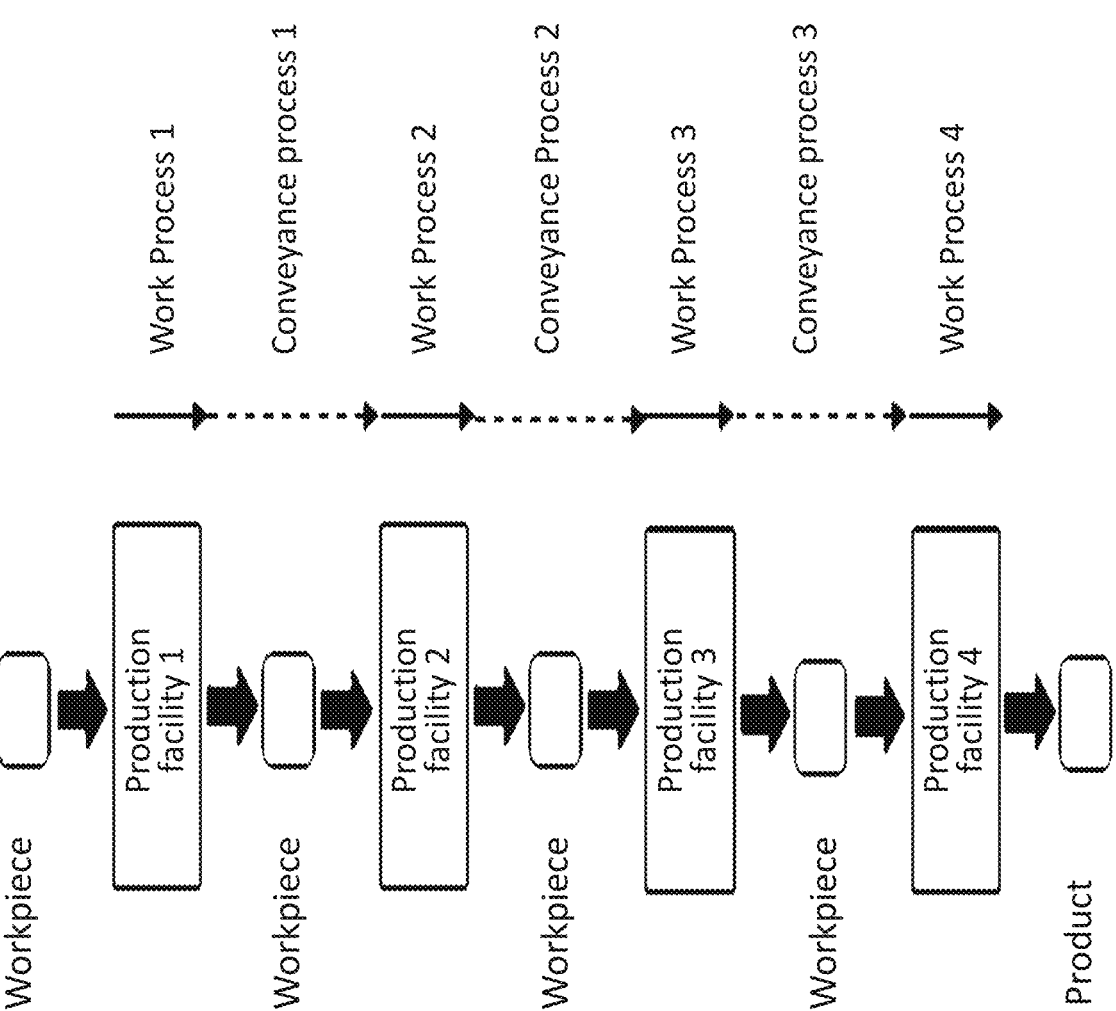
FIG. 4 shows an example of a manufacturing process according to Embodiment 1.

FIG. 3 shows a data structure of a database stored in the storage unit 230. For example, assume a case where products whose workpieces are processed through multiple work processes, as shown in FIG. 4, are repeatedly produced. A data structure for storing the operation data acquired from such production in a database format is shown in FIG. 3. The database stored in the storage unit 230 has a structure in which the work start times and the work end times in the respective work processes are associated with the workpieces corresponding to product numbers.

"Product number" is a number uniquely assigned to each product piece of the product produced in a factory. The operation data of the product piece with the product number "SN0001", for example, shows that: the processing in Work Process 1 is started at time '08:00:00' and ended at time '08:10:00'; the processing in Work Process 2 is started at time '08:15:00' and ended at time '08:20:00'; the processing in Work Process 3 is started at time '08:25:00' and ended at time '08:35:00'; and the processing in Work Process 4 is started at time '08:40:00' and ended at time '08:50:00'. The product number generally is a number that is uniquely assigned to each product piece that is actually produced. Instead, however, the same number may be assigned to each group of product pieces.

Figure 5:
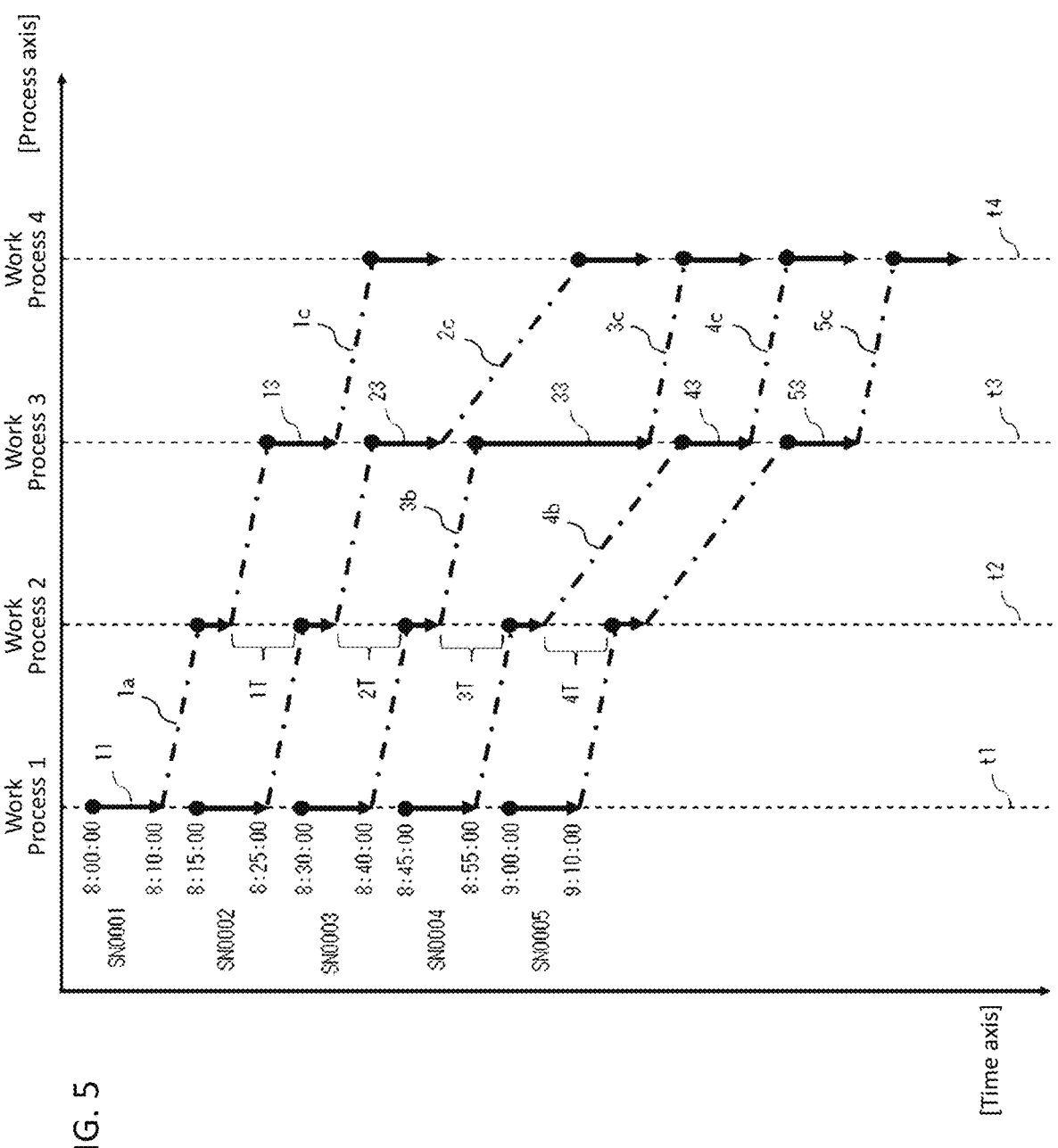
FIG. 5 shows an example of display data of a work process management chart displayed by the process management device according to Embodiment 1.

FIG. 5 shows an example of the display data of the work process management chart displayed by the process management device 200, wherein the operation data shown in FIG. 3 is displayed on the display unit as a work process management chart. The work process management chart includes a two-dimensional coordinate system, made up of a time axis representing time and a process axis representing work process. That is, the work process management chart—which includes a two-dimensional coordinate system made up of the time axis representing the work time in each work process and the process axis representing transition in the work processes where the manufacturing takes place—visually represents, for each of the plurality of product pieces, the work time in each work process, a conveyance time in a conveyance process, and a production waiting time in each work process by arranging and displaying the operation data associated with each product number in the form of connection lines at their respective coordinate positions. The production waiting time includes a setup time. In FIG. 5, Work Process 1 is the most upstream work process; as the process proceeds to the right, the work processes to be performed in more downstream side are shown. Time axes t1, t2, t3, and t4 are a time axis corresponding to Work Process 1, a time axis corresponding to Work Process 2, a time axis corresponding to Work Process 3, and a time axis corresponding to Work Process 4, respectively. Although, in FIG. 5, as an example, the time axes are set as vertical axes of the work process management chart and the process axis is set as the horizontal axis thereof, the arrangement of the time axes and the process axis may be reversed.

A line segment connecting the coordinates corresponding to the work start time and the coordinates corresponding to the work end time in each work process represents the work time in each work process. Hereinafter, this line segment will be referred to as work time line. Also, on the work time line, a coordinate point corresponding to the work start time may be called start point of the work time line and a coordinate point corresponding to the work end time may be called end point of the work time line. For example, a work time line 11 shown in FIG. 5 indicates that, in Work Process 1, the processing to a first product workpiece (product number SN0001) is started at a work start time '08:00:00' and ended at a work end time '08:10:00'. Hereinafter, the first product workpiece is referred to as "first workpiece". The longer the length of the work time line is, the longer the work time in the work process is. For ease of explanation, the display shown in FIG. 5 includes product numbers such as "SN0001", work start times such as '08:00:00', and work end times such as '08:10:00'. These representations, however, may not always be necessary, so that they may be configured to be displayed or not depending on the manager's preference.

The time taken to convey the workpiece from a first work process to a following work process of the first work process (hereinafter referred to as second work process) is a conveyance time. The conveyance time corresponds to an inclination of a line segment (hereinafter referred to as conveyance time line) that connects the end point of the work time line in the first work process and the start point of the work time line in the second work process. For example, a conveyance time line 1a shown in FIG. 5 indicates that the conveyance of the first workpiece is started at '08:10:00' in Work Process 1 and ended at '08:15:00' in Work Process 2. The larger inclination of the conveyance time line indicates that the conveyance time from the first work process to the second work process is longer.

The production waiting time in each work process corresponds to an interval on the time axis of the same work process (hereinafter referred to as work time line interval) between the end point of the work time line of the first product piece, among a plurality of product pieces, and the start point of the work time line of a product piece, among the plurality of product pieces, subsequent to the first product piece (hereinafter referred to as second product piece). For example, the work time line intervals 1T, 2T, 3T, and 4T shown in FIG. 5 represent the production waiting times in Work Process 2. The wider work time line interval indicates that the production waiting time is longer.

By showing such display data as the work process management chart, the process management device 200 can assist in identifying the following three causes on the basis of the characteristics of the lengths of the work time lines, the work time line intervals, or the inclinations of the conveyance time lines.

1. Deficiency of Production Capacity in Production Facilities

If all the work time line intervals are wider than normally necessary in a certain work process, it is indicated that, in either or both of the work processes before and after the concerned work process, production capacity of the corresponding production facilities may be insufficient against a production plan.

The example in FIG. 5 will be used to illustrate this. In an ideal production plan, the production waiting times should be as short as possible in each work process in order to increase the production efficiency of the entire factory. However, it is necessary that the production waiting times in each work process include, to a greater or lesser extent, a predetermined amount of time such as setup time. The example in FIG. 5 shows a case where the work time line intervals 1T, 2T, 3T, and 4T are all wider than the predetermined amount of time in Work Process 2. In such a case, time for wasteful adjustments, other than the predetermined amount of time, may have been included in the production waiting times in Work Process 2 because of the deficiency of production capacity in either or both of the production facilities corresponding to the work processes before and after Work Process 2.

For example, the deficiency of production capacity in the production facility in Work Process 1 lengthens the work times for all of the product pieces in Work Process 1. This delays the work start times in following Work Process 2 and thus widens the work time line intervals 1T, 2T, 3T, and 4T than the predetermined amount of time. Thus, if all the work time line intervals are wider than normally necessary in a certain work process, it is indicated that, in either or both of the work processes before and after the concerned work process, production capacity of the corresponding production facilities may be insufficient against the production plan.

2. Conveyance Trouble between Work Processes

Among the plurality of conveyance time lines between a certain work process and the following work process, if an inclination of the conveyance time line for one product piece is larger than an inclination of the conveyance time lines for other product pieces, it is indicated that a conveyance trouble between the concerned work processes may have occurred.

The example in FIG. 5 will be used to illustrate this. For example, assume that processing in Work Process 3 is ended for a second product workpiece (product number SN0002), the product workpiece (hereinafter referred to as "second workpiece") then being conveyed to Work Process 4. Normally, if no conveyance trouble has occurred, processing can be started in Work Process 4 for the second workpiece conveyed from Work Process 3 immediately after a predetermined time interval required for setup, etc. following the end of processing for the first workpiece in Work Process 4. Therefore, the inclination of the conveyance time line is the same as the inclination of the conveyance time line 1c of the first workpiece that was normally conveyed. If the conveyance time from Work Process 3 to Work Process 4 is longer than normal due to occurrence of a conveyance trouble during the conveyance of the workpiece to Work Process 4 after the end of processing in Work Process 3 for the second workpiece, the arrival of the second workpiece to Work Process 4 is delayed and the work start time is later than originally planned. Thus, the inclination of a conveyance time line 2c in FIG. 5 is larger than the inclinations of the other conveyance time lines 1c, 3c, 4c, 5c when no conveyance trouble occurred between Work Process 3 and Work Process 4.

In contrast, the inclination of a conveyance time line 4b in FIG. 5 also is larger than the inclination of a conveyance time line 3b of a third product workpiece (product number SN0003), the product workpiece hereinafter being referred to as "third workpiece". However, this is because the work start time for a fourth product workpiece (product number SN0004) in Work Process 3, the product workpiece hereinafter being referred to as "fourth workpiece", is later than originally planned due to the work time for the third workpiece in Work Process 3 being longer than planned. In such a case, the work time line intervals in Work Process 3 are not wider than normally necessary, although the inclination of the conveyance time line 4b in FIG. 5 is larger. Thus, among the work time lines on the same time axis of the second work process, for example, if the work time line interval between a work time line m2 and a work time line n2 following the work time line m2 is wider than normally necessary and the inclination of a conveyance time line connected to the start point of the work time line n2 is larger than other conveyance time lines between the first work process and the second work process, it is indicated that a conveyance trouble may have occurred between the concerned work processes.

3. Production Trouble

On a time axis of the same work process, if the work time line for a product piece is longer than the work time lines of other product pieces, it is indicated that a production trouble may have occurred when processing for the concerned product piece was performed in the concerned work process.

The example in FIG. 5 will be used to illustrate this. As shown in Work Process 3, if a production trouble occurs while the third workpiece is being processed, the work time is longer than normal. Thus, the length of a work time line 33 in FIG. 5 is longer than work time lines 13, 23, 43, 53 for other product pieces to which no production trouble has occurred. Thus, in the same work process, if the work time line for a product piece is longer than the work time lines of other product pieces, it is indicated that a production trouble may have occurred when processing for the concerned product piece was performed.

Each of functional units included in the control unit 220 will be described. The connection line arrangement unit 221 arranges a first mark (●) representing a work start time and a second mark (▼) representing a work end time at their respective coordinate positions on the work process management chart on the basis of the operation data. Specific processing by the connection line arrangement unit 221 will be described below. First, the connection line arrangement unit 221 acquires the operation data from the database stored in the storage unit 230 for each product number. Then, from the operation data for each product number acquired, the work start time and the work end time of each work process and the number of work processes required to manufacture one unit of the product are extracted.

Next, the connection line arrangement unit 221 calculates the scales of the time axis and the process axis that generate the coordinates of the work process management chart on the basis of the extracted maximum value of the work end time and number of the work processes and a display area designated for the work process management chart. Since the scale of the process axis corresponds to the interval between the time axes, it may henceforth be referred to as interval of time axes.

Specifically, when the work process management chart is displayed in the display area designated for the work process management chart, the connection line arrangement unit 221 calculates the scale of the time axis and the interval between the time axes on the basis of the extracted maximum value of the work end time and number of the work processes and the display area for the work process management chart, such that the work process management chart fits in the display area designated for the work process management chart. The intervals of the time axes are calculated to be equally spaced. The connection line arrangement unit 221 stores the calculated scale of the time axis and the interval between the time axes in the storage unit 230 as setting information of the coordinate system of the work process management chart. In this way, the connection line arrangement unit 221 generates the coordinate system of the work process management chart that matches in size the display area designated for the work process management chart.

Next, the connection line arrangement unit 221 arranges the first mark (●) and the second mark (▼) at their respective coordinate positions on the work process management chart on the basis of the extracted work start time and work end time for each work process. By repeating the same process for the operation data for all of the product numbers, the connection line arrangement unit 221 generates connection line arrangement data, which is display data with the first marks (●) and the second marks (▼) in each work process arranged at their respective coordinate positions on the work process management chart.

For example, when generating the connection line arrangement data from the operation data shown in FIG. 3, the connection line arrangement unit 221 performs the following processes. The connection line arrangement unit 221 acquires a work start time '08:00:00' and a work end time '08:10:00' in Work Process 1 for the product piece with a product number "SN0001". The connection line arrangement unit 221 acquires a work start time '08:15:00' and a work end time '08:20:00' in Work Process 2 for the product piece with the product number "SN0001". The connection line arrangement unit 221 acquires a work start time '08:25:00' and a work end time '08:35:00' in Work Process 3 for the product piece with the product number "SN0001". The connection connection line arrangement unit 221 acquires a work start time '08:40:00' and a work end time '08:50:00' in Work Process 4 for the product piece with the product number "SN0001".

Figure 6:
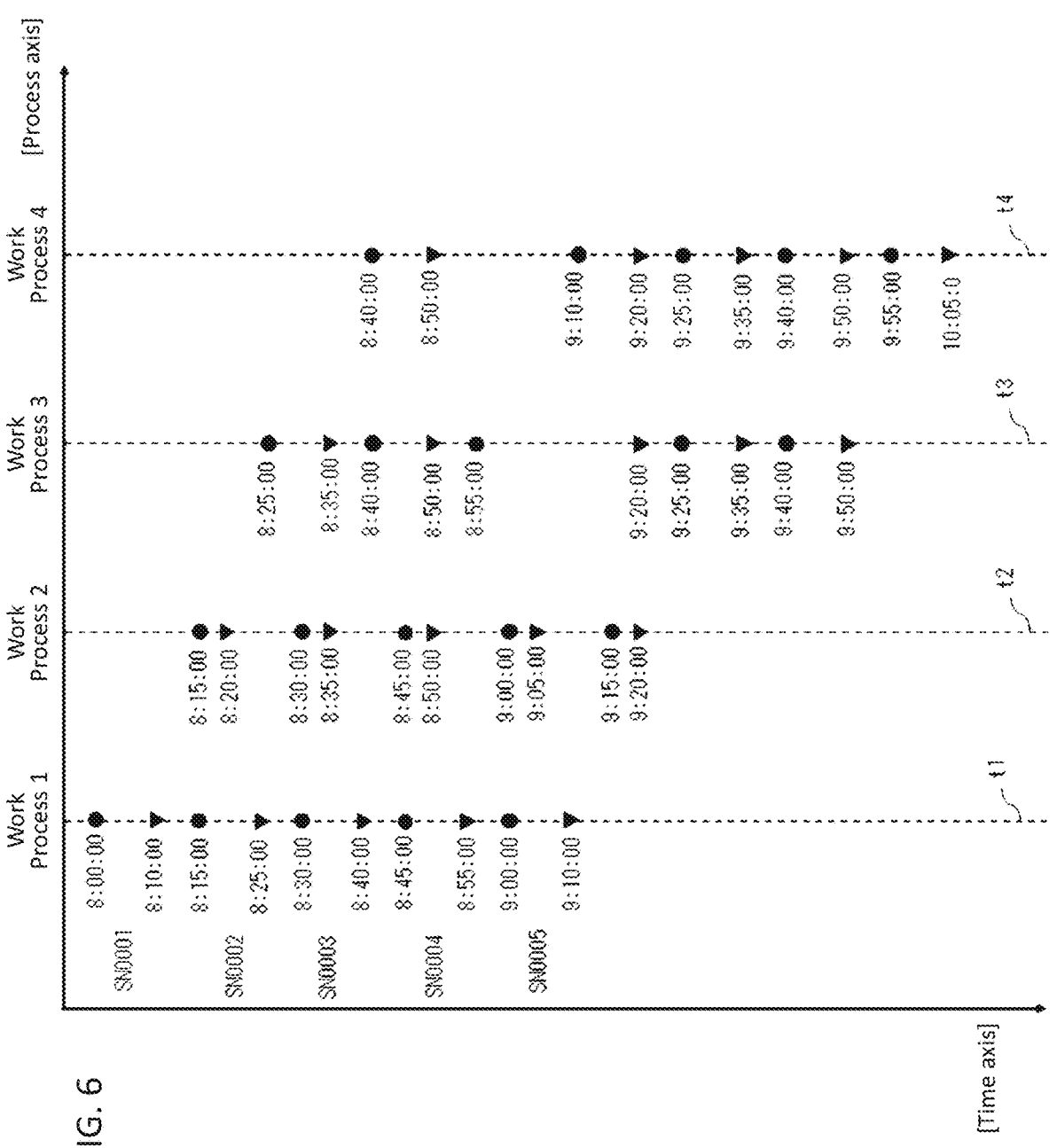
FIG. 6 shows an example of connection line arrangement data generated by the process management device according to Embodiment 1.

Next, the connection line arrangement unit 221 arranges the first mark (●) and the second mark (▼) at their respective coordinate positions on the work process management chart on the basis of the work start time '08:00:00' and the work end time '08:10:00' in Work Process 1 of the product piece with the product number "SN0001". The connection line arrangement unit 221 arranges the first mark (●) and the second mark (▼) at their respective coordinate positions on the work process management chart on the basis of the work start time '08:15:00' and the work end time '08:20:00' in Work Process 2 of the product piece with the product number "SN0001". The connection line arrangement unit 221 arranges the first mark (●) and the second mark (▼) at their respective coordinate positions on the work process management chart on the basis of the work start time '08:25:00' and the work end time '08:35:00' in Work Process 3 of the product piece with the product number "SN0001". The connection line arrangement unit 221 arranges the first mark (●) and the second mark (▼) at their respective coordinate positions on the work process management chart on the basis of the work start time '08:40:00' and the work end time '08:50:00' in Work Process 4 of the product piece with the product number "SN0001". By performing the same processes for all of the product numbers and arranging the first marks (●) and the second marks (▼) on their respective coordinate positions on the work process management chart, the connection line arrangement data shown in FIG. 6 is generated.

The connection line generation unit 222 generates a work time line by connecting, on the basis of the connection line arrangement data, the first mark (●) and the second mark (▼), from among the first marks (●) and the second marks (▼) arranged on the work process management chart, corresponding to the same product number and the same work process. In other words, for each of the product pieces, on the basis of the connection line arrangement data, the connection line generation unit 222 generates a work time line by connecting the first mark (●) and the second mark (▼) arranged on the time axis of the first work process among the multiple work processes and generates another work time line by connecting the first mark (●) and the second mark (▼) arranged on the time axis of the second work process among the multiple work processes.

Figure 7:
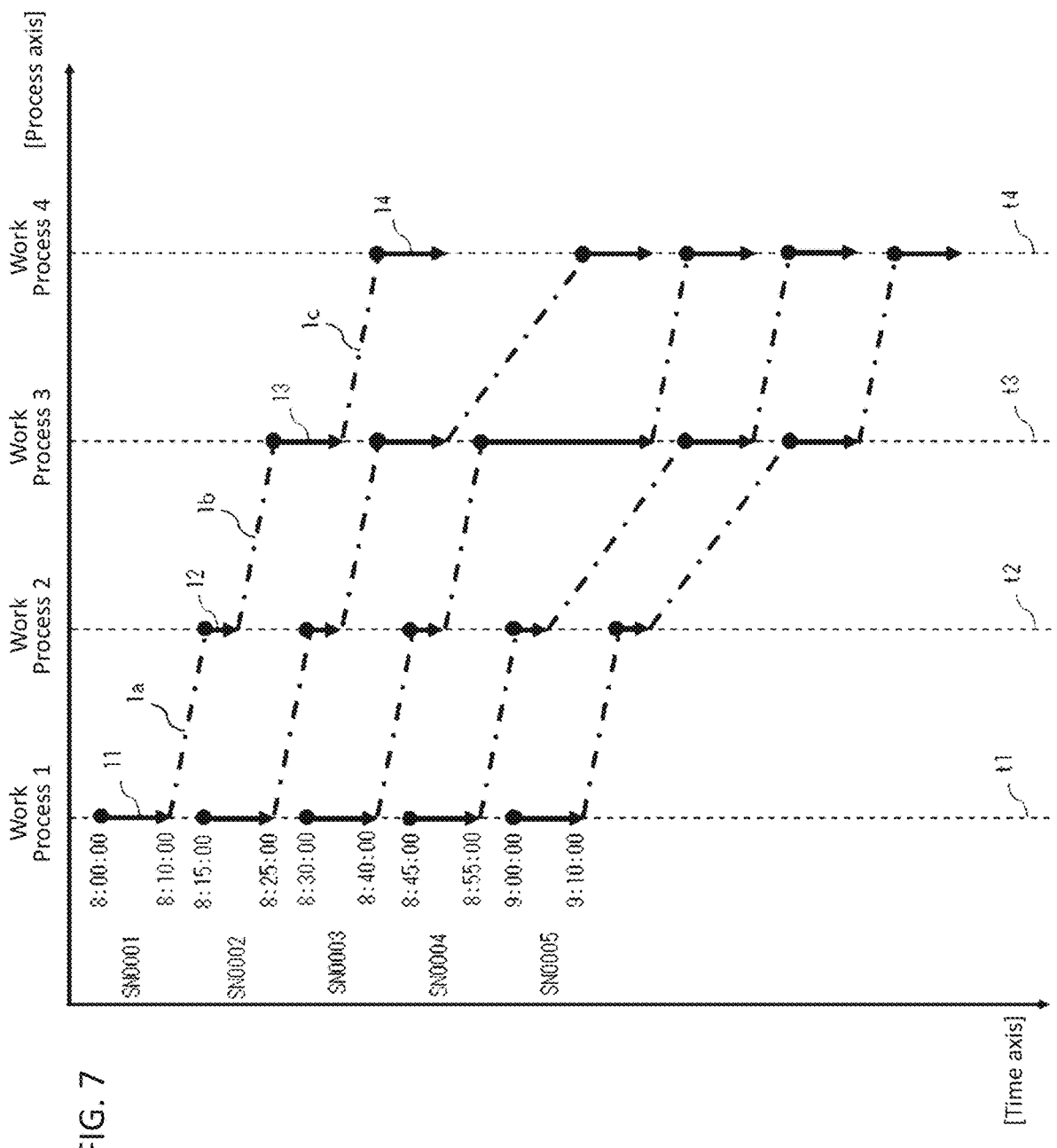
FIG. 7 shows an example of first display data displayed by the process management device according to Embodiment 1.

Also, for each of the product pieces, the connection line generation unit 222 generates a conveyance time line by connecting the second mark (▼) in the first work process and the first mark (●) in the second work process among the first marks (●) and the second marks (▼) arranged on the work process management chart. The processes by the connection line generation unit 222 will be described with reference to FIG. 7. FIG. 7 is a chart to illustrate the processes by the connection line generation unit 222 and shows the work time lines and the conveyance time lines generated from the connection line arrangement data shown in FIG. 6.

For example, for the product piece with the product number "SN0001", the connection line generation unit 222 connects the first mark (●) and the second mark (v) in Work Process 1 to generate the work time line 11 in Work Process 1. For the product piece with the product number "SN0001", the connection line generation unit connects the first mark (●) and the second mark (▼) similarly in each of the remaining work processes to generate the work time lines 12 through 14. At this time, the connection line generation unit

222 generates the work time lines in accordance with formats of the work time lines set in advance from the data input unit 240 and stored in the storage unit 230. The formats of the work time lines that can be set include, for example, the color of a connection line, the type of a connection line, the thickness of a connection line, the type of the first mark of a connection line, and the type of the second mark of a connection line. In the example in FIG. 7, the work time lines are generated as solid lines.

Next, for the product piece with the product number "SN0001", the connection line generation unit 222 connects the second mark (▼) of the work time line 11 and the first mark (●) of the work time line 12 to generate a conveyance time line 1a. For the product piece with the product number "SN0001", the connection line generation unit similarly connects the second mark (▼) of a work time line and the first mark (●) of the following work time line in the remaining work processes to generate conveyance time lines 1b and 1c. At this time, the connection line generation unit generates the conveyance time lines in accordance with formats of the conveyance time lines set in advance from the data input unit 240 and stored in the storage unit 230. The formats of the conveyance time lines that can be set include, for example, the color of a connection line, the type of a connection line, the thickness of a connection line, the type of the first mark of a connection line, and the type of the second mark of a connection line. In the example in FIG. 7, the conveyance time lines are generated as dashed and dotted lines. By setting different formats for the work time lines and the conveyance time lines, it is possible to make it easier for the manager to visually distinguish between the work time lines and the conveyance time lines.

The connection line generation unit 222 repeats the processes described above also for the other product numbers to generate display data (hereinafter referred to as "first display data") of the work process management chart to be used for reference as shown in FIG. 7. In other words, the first display data is display data before adjusting the representation method of the work process management chart. For example, if the display data of the work process management chart to be used for reference is initially generated for ease of use by matching the display data to a display area corresponding to an entire screen, that is the first display data. Alternatively, if the display data of the work process management chart to be used for reference is initially generated for ease of use by matching the display data to a display area corresponding to a half of the entire screen, that is the first display data. In FIG. 7, the line segments inclusive of the first mark (●) and the second mark (▼) are denoted as the work time lines. The connection line generation unit 222 stores the generated first display data in the storage unit 230.

When the manager's request instruction information for the first display data is inputted from the data input unit 240, the connection line adjustment unit 223 adjusts the representation method of the first display data in accordance with the request instruction information to generate second display data from the first display data. That is, when the manager's request instruction information for the first display data is inputted from the data input unit 240, the connection line adjustment unit 223 generates the second display data, which is the display data of the work process management chart visualizing, on the basis of the request instruction information, the production status visualized by the first display data, by using the representation method of the work process management chart different from the representation method of the work process management chart displayed based on the first display data. That is, although both the first display data and the second display data are the display data of the work process management chart visualizing the same production status, the second display data is display data of the work process management chart after adjusting the representation method of the work process management chart displayed based on the first display data display data.

Here, the cases where the representation method of the work process management chart needs to be adjusted will be described. However, these are examples and are not limitations. Even when the display unit 210 has a sufficient display area, the display size of the work process management chart may be restricted due to some limitations for the display area that can be used for the display of the work process management chart. For example, such cases include a case where the first display data was initially generated to match the display area corresponding to the entire screen, but later on it becomes necessary to simultaneously display other information on the same screen. In such a case, for example, the work process management chart is displayed in a display area corresponding to a half of the screen, and the other information is displayed in a display area corresponding to the other half. Thus, the display area that can display the work process management chart is limited. However, in a case where the work process management chart displayed based on the first display data as shown in FIG. 7 is squeezed and displayed to fit in size of such a limited display area, if the display data of the work process management chart for which the scale of the work process management chart displayed based on the first display data is simply changed to match the limited display size of the display area without any adjustment is generated and displayed, the displayed work process management chart may not be easy to visually recognize.

For example, in a case where the work process management chart displayed based on the first display data is displayed to fit in size of such a limited display area by simply changing the scale without any adjustment, when the work process management chart displayed based on the first display data needs to be squeezed in the time axis direction, the displayed work process management chart may become difficult to visually recognize because also the work time lines are squeezed at the same time in the time axis direction and may then be crushed, which is undesirable for the management of the work processes.

Figure 8:
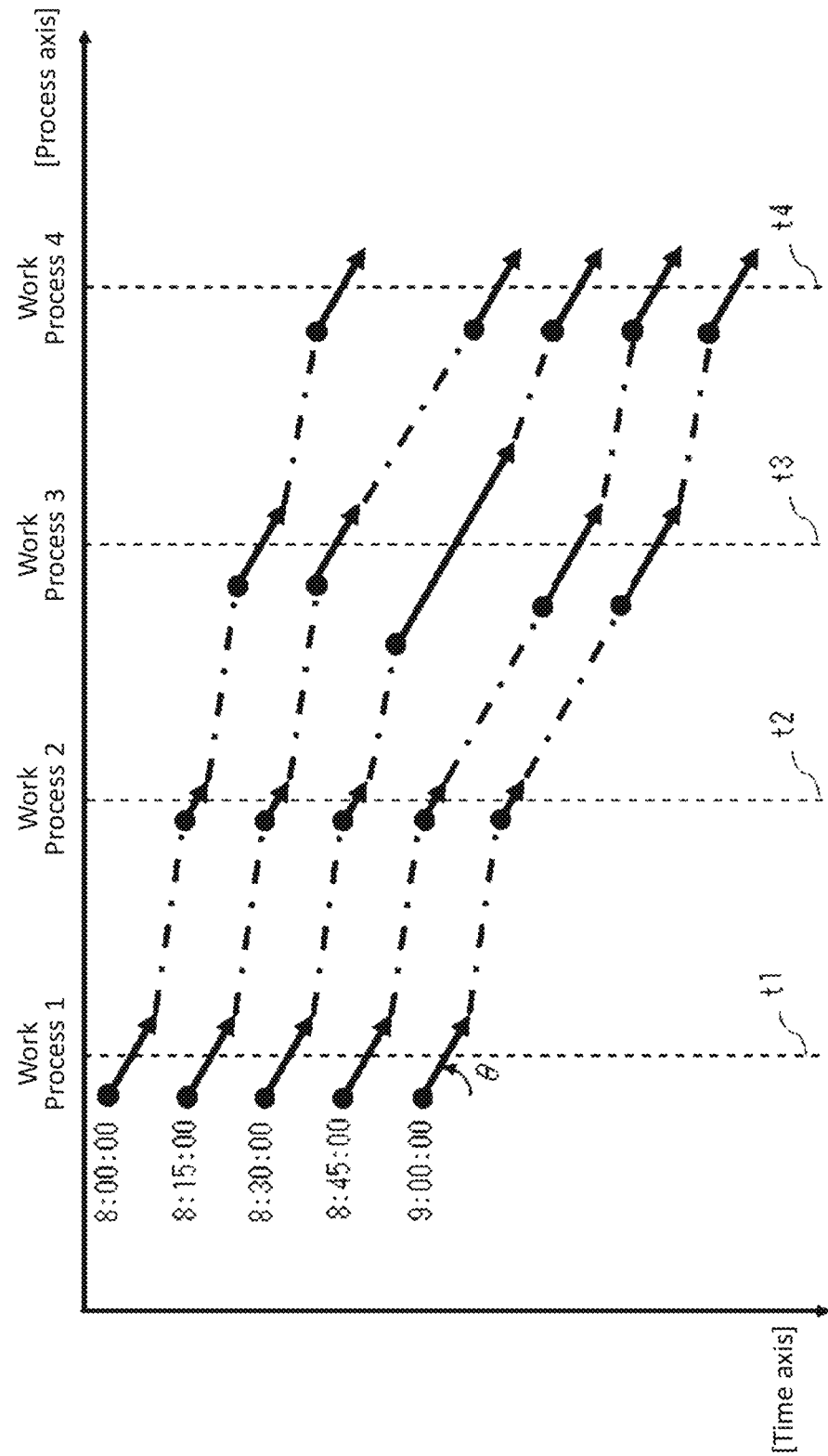
FIG. 8 shows an example of second display data displayed by the process management device according to Embodiment 1.

The processing procedure for generating the second display data by adjusting the representation method such that the work time lines are not crushed even when the work process management chart displayed based on the first display data is squeezed in the time axis direction and displayed accordingly will be described with reference to FIGS. 7 and 8. FIG. 8 is a chart to illustrate the processes by the connection line adjustment unit 223. FIG. 8 shows an example of the work process management chart displayed based on the second display data generated by adjusting the representation method such that the work time lines are not crushed when the work process management chart displayed based on the first display data as shown in FIG. 7 is squeezed in the time axis direction by a squeeze ratio of 1/2. The work process management chart is successfully squeezed in the time axis direction with the length of each work time line on the work process management chart displayed based on the first display data unchanged.

When the work process management chart displayed based on the first display data is squeezed in the time axis direction, the connection line adjustment unit 223 calculates an angle of inclination of the work time lines on the basis of the squeeze ratio in the time axis direction, inclines the work time lines in accordance with the calculated angle of inclination, and rearranges them on the work process management chart.

To give a concrete example, firstly, the request instruction information with an intention to "change the work process management chart displayed based on the first display data to a work process management chart squeezed by 1/2 in the time axis direction" is inputted from by the data input unit by the manager. Here, the request instruction information is inputted in a text format, but the method to give the request instruction information, shown here, is an example and not limiting.

Next, the connection line adjustment unit 223 analyzes a content of the request instruction information and adjusts the representation method on the basis of the analysis result. Specifically, the connection line adjustment unit 223 first calculates the angle of inclination for the work time lines on the basis of the analysis result for the request instruction information. When the work process management chart displayed based on the first display data is squeezed in the time axis direction by the squeeze ratio X, the angle θ of inclination of the work time lines can be calculated by the following expression (1).

[Expression 1]

$$\theta = \arccos X \qquad (1)$$

In the case of the squeeze ratio X being 1/2, the angle θ of inclination being 60 degrees can be obtained from Expression (1). The connection line adjustment unit 223 also generates the coordinate system of the work process management chart displayed based on the second display data on the basis of the analysis result of the request instruction information. Specifically, the connection line adjustment unit 223 reads the setting information of the coordinate system of the work process management chart displayed based on the first display data stored in the storage unit 230, multiplies a scale given in the setting information of the time axis by the squeeze ratio 1/2, calculates the scale of the time axis of the work process management chart displayed based on the second display data, and stores the calculated scale of the time axis as the setting information of the coordinate system of the work process management chart displayed based on the second display data in the storage unit 230. When the work process management chart displayed based on the first display data is squeezed by 1/2 in the time axis direction, the scale setting information of the process axis is not changed, so that the scale of the process axis of the work process management chart displayed based on the first display data is stored as such in the storage unit 230 as the setting information of the coordinate system of the work process management chart displayed based on the second display data. Thus, the connection line adjustment unit 223 squeezes the coordinate system of the work process management chart displayed based on the first display data by 1/2 in the time axis direction and generates the coordinate system of the work process management chart displayed based on the second display data.

Next, the connection line adjustment unit 223 inclines each work time line on the work process management chart displayed based on the first display data with its length unchanged such that the position of the second mark (▼) of the work time line is lifted toward the process axis with the midpoint of the work time line acting as the pivot point by the calculated angle of inclination, or 60 degrees. Hereinafter, the work time line obtained by inclining, in accordance with the squeeze ratio, each work time line on the work process management chart displayed based on the first display data toward the direction of the process axis with its length unchanged may be referred to as "inclined work time line". Next, the connection line adjustment unit 223 reads the scale setting information of the time axis from the storage unit 230 and changes the scale of the time axis of the work process management chart displayed based on the first display data to the scale of the time axis of the work process management chart displayed based on the second display data to squeeze the time axis. Next, the connection line adjustment unit 223 translates each inclined work time line in the time axis direction such that the position of the first mark of the inclined work time line is matched to the work start time corresponding to the inclined work time line on the scale of the time axis of the work process management chart displayed based on the second display data. Next, the connection line adjustment unit 223 redraws the conveyance time lines in accordance with the inclined work time lines after translation and generates the second display data such that the connection relationships between each work time line and each conveyance time line on the work process management chart displayed based on the first display data is maintained. Thus, the second display data as shown in FIG. 8 can be obtained. The connection line adjustment unit 223 stores the generated second display data in the storage unit 230.

While the request instruction information for the first display data is not inputted from the data input unit, the output unit 224 outputs the first display data to the display unit 210 as the display data for outputting the work process management chart. When the request instruction information for the first display data is inputted from the data input unit, the output unit 224 outputs the second display data to the display unit 210 as the display data for outputting the work process management chart. Hereinafter, the first display data and the second display data may be collectively referred to as "display data of the work process management chart". It is described above that the manager can identify the causes preventing the productivity improvement by checking characteristic values of characteristic parts, as judgment indexes on whether the production status is good or bad, such as the length of the work time line, the work time line interval, and the inclination of the conveyance time line on the work process management chart. Alternatively, the output unit may set in advance an allowable value for each characteristic value in the process management device to extract the characteristic values of the characteristic parts, as the judgment indexes on whether the production status is good or bad, from the work process management chart displayed by the display data of the work process management chart, and output, if a characteristic value of a characteristic part is larger than the allowable value, the display data of the work process management chart with a discrimination sign for assisting assessment of the production status added to the characteristic part as the display data for outputting the work process management chart.

For example, for each work process, an allowable value for the work time line interval may be set. In that case, if all of the work time line intervals are wider in a certain work process than the allowable value, the output unit adds the discrimination signs indicating that all of the work time line intervals are wider than the allowable value. For example, each of the work time line intervals on the time axis of the work process may be marked by a sign X. The discrimination display method, however, is not limited to this method because it is sufficient just to show that all of the work time line intervals are wider than the allowable value.

If the discrimination signs are attached to all of the work time line intervals in a certain work process, the manager can figure out that the production capacities of the production facilities for the work processes before and/or after the concerned work process with the discrimination signs attached may be insufficient.

Also, for each interval between the work processes, an allowable value may be set for the inclination of the conveyance time lines. In that case, if a certain conveyance time line is more inclined than the inclination set as the allowable value, the output unit adds to the conveyance time line a discrimination sign indicating that a conveyance trouble may have occurred between the concerned work processes. For example, the conveyance time line may be displayed in a color different from the color of the conveyance time lines which have no conveyance trouble. The discrimination display method, however, is not limited to this method because it is sufficient just to show that a conveyance trouble may have occurred between the work processes corresponding to the conveyance time line.

Also, for each work process, an allowable value for the length of the work time line may be set. In that case, if a certain work time line is longer than the allowable value in a work process, the output unit adds to the work time line a discrimination sign indicating that a production trouble may have occurred in the work process. For example, the work time line may be displayed in a color different from the color of the work time lines which have no production trouble. The discrimination display method, however, is not limited to this method because it is sufficient just to show that a production trouble may have occurred in the work process.

Figure 9:
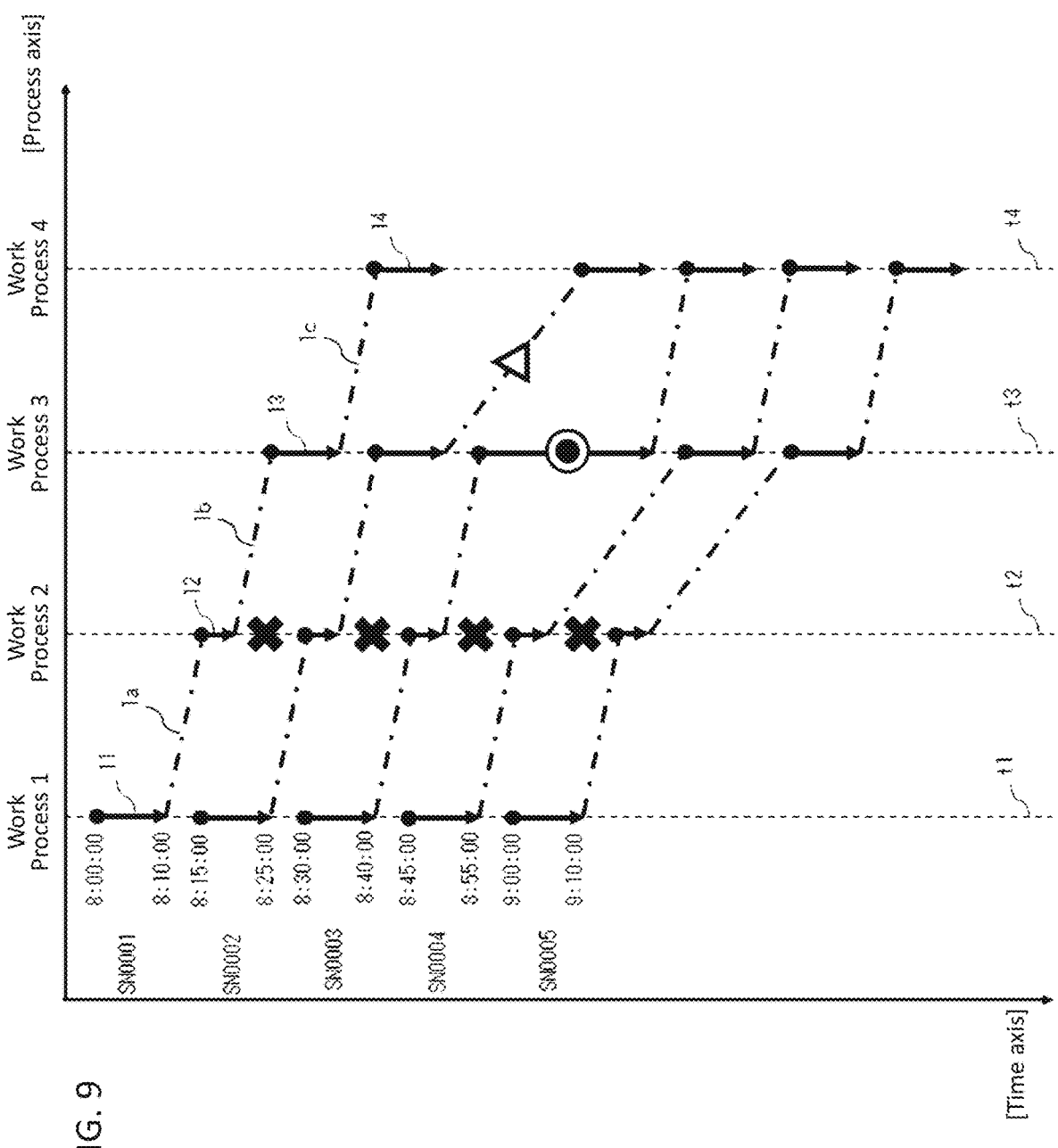
FIG. 9 shows an example of display data of the work process management chart with discrimination signs for assisting assessment of a production status added to characteristic parts of the work process management chart shown in FIG. 7.

FIG. 9 shows an example of the display data of the work process management chart with the discrimination signs for assisting assessment of the production status added to the characteristic parts of the work process management chart shown in FIG. 7. In FIG. 9, the marks (X) are added to the concerned work time line intervals as an example of the discrimination signs indicating that all of the work time line intervals are wider than the allowable value. A mark (Δ) is added to the concerned conveyance time line as an example of the discrimination sign indicating that a conveyance trouble may have occurred between the work processes. A mark (⊙) is added to the concerned work time line as an example of the discrimination sign indicating that a production trouble may have occurred in the work process.

Thus, by setting predetermined criteria in advance in the process management device 200, the output unit 224 can automatically add the discrimination signs to the characteristic parts on the work process management chart in accordance with the criteria. Therefore, the manager does not need to find the characteristic parts on his/her own and thus can easily identify the causes preventing the productivity improvement. In other words, the output unit 224 extracts the characteristic values of the characteristic parts, as the judgment indexes on whether the production status is good or bad, from the work process management chart displayed based on the first display data or the second display data and outputs, on the basis of the allowable value predetermined for each characteristic value, the display data of the work process management chart with the discrimination signs for assisting assessment of the production status added to the characteristic parts of the work process management chart displayed based on the first display data or the second display data as the display data for outputting the work process management chart, so that the manager can assess the production status with ease.

Figure 10:
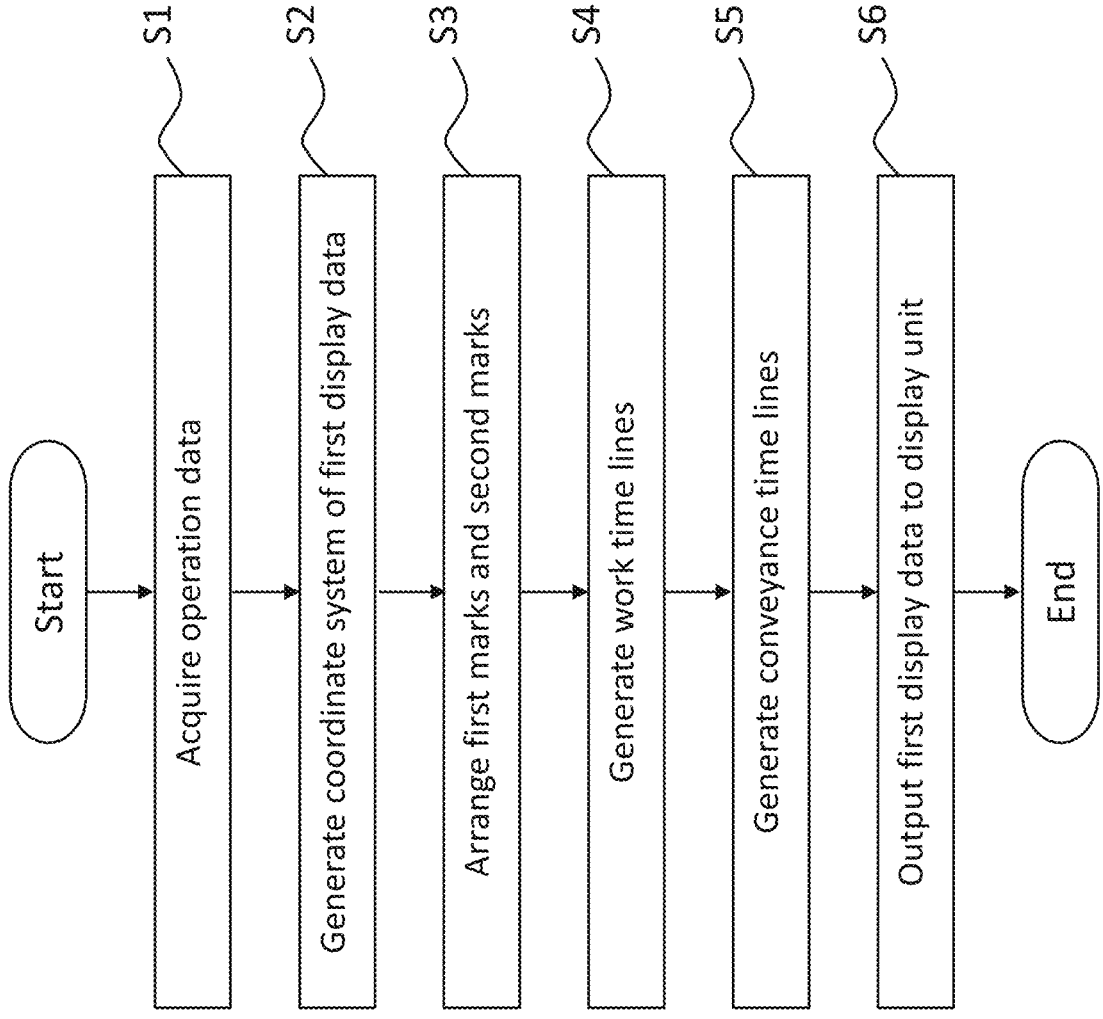
FIG. 10 shows a flowchart illustrating a process in which the process management device according to Embodiment 1 generates the first display data.

Next, the process flow of the process management device 200 generating the first display data will be described. FIG. 10 shows a flowchart illustrating a process in which the first display data is generated. First, the connection line arrangement unit 221 acquires the operation data from the storage unit 230 (step S1). Specifically, the connection line arrangement unit 221 acquires the operation data from the database stored in the storage unit 230 for each product number and extracts the work start time and work end time for each work process and the number of the work processes. Then, when displaying the first display data in the display area designated for the first display data on the basis of the information extracted in step S1, the connection line arrangement unit 221 generates the coordinate system of the work process management chart displayed based on the first display data such that the first display data fits in the display area designated for the first display data (step S2).

Next, the connection line arrangement unit 221 arranges the first marks (●) and the second marks (▼) at their respective coordinate positions on the work process management chart on the basis of the extracted work start times and the extracted work end times for each work process (step S3). Next, the connection line generation unit 222 generates the work time lines by connecting the first mark (●) and the second mark (▼) corresponding to the same product number and the same work process among the first marks (●) and the second marks (▼) arranged on the work process management chart (step S4).

Then, the connection line generation unit 222 generates the conveyance time lines by connecting the second marks (▼) of the work time lines of the first work process and the respective first marks (●) of the work time lines of the second work process among the first marks (●) and the second marks (▼) arranged on the work process management chart (step S5). The order of step S4 and step S5 may be reversed, or they may be performed simultaneously in parallel. Next, the output unit outputs the first display data generated through the processes up to step S5 to the display unit 210 as the display data for outputting the work process management chart (step S6).

Figure 11:
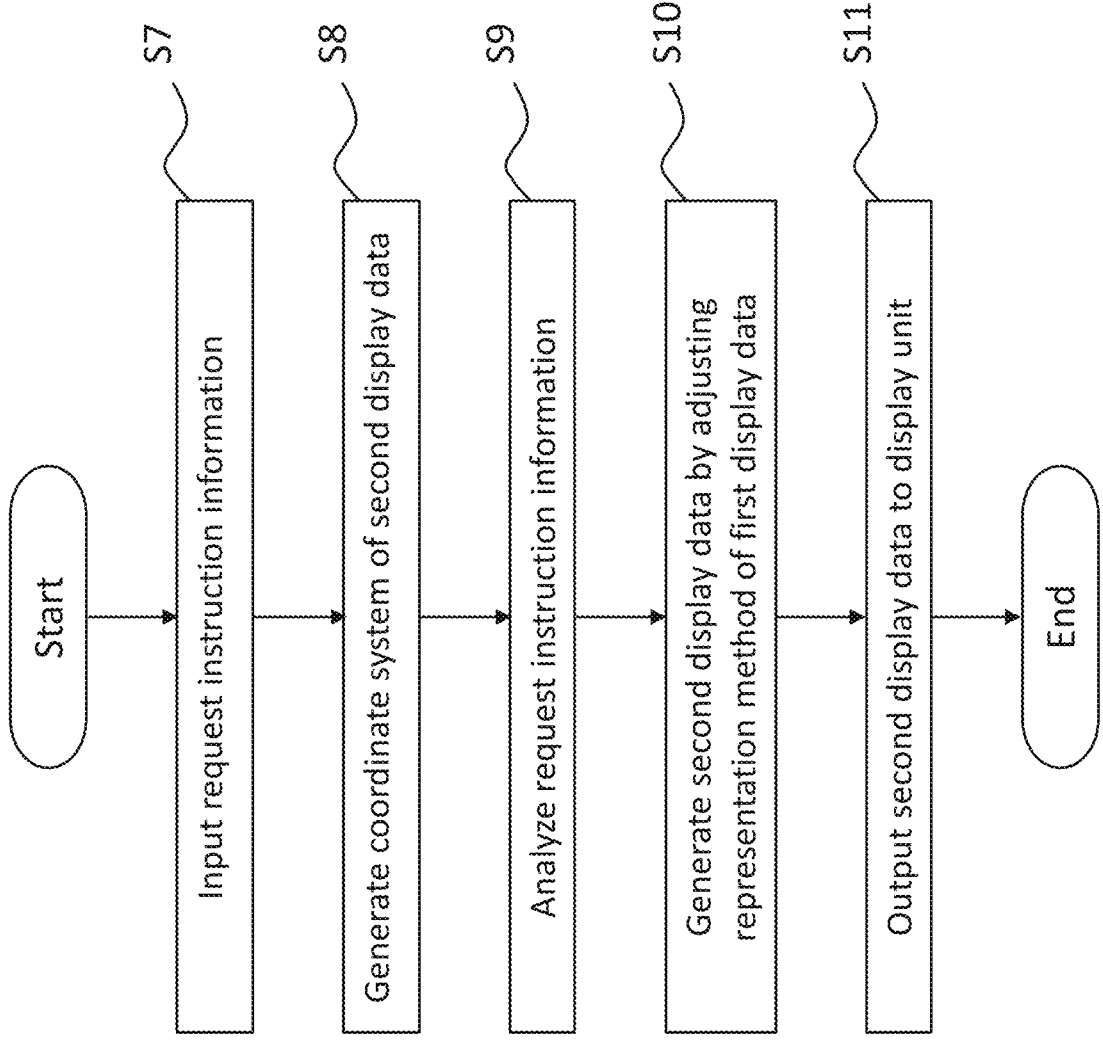
FIG. 11 shows a flowchart illustrating a process in which the process management device according to Embodiment 1 generates the second display data.

Next, the process flow of the process management device 200 generating the second display data will be described. FIG. 11 shows a flowchart illustrating a process in which the second display data is generated. First, the request instruction information for the first display data is inputted by the manager from the data input unit 240 (step S7). Next, the connection line adjustment unit 223 generates the coordinate system of the work process management chart displayed based on the second display data (step S8). Next, the connection line adjustment unit 223 analyses the content of the request instruction information (step S9). Then, on the basis of the analysis result of the content of the request instruction information, the connection line adjustment unit 223 generates the second display data by adjusting the first display data using the representation method according to the request instruction (step S10). In Embodiment 1, by inclining the work time lines on the work process management chart displayed based on the first display data and thus without changing the lengths of the work time lines on the work process management chart displayed based on the first display data, the second display data that is squeezed in the time axis direction is generated. Next, the output unit 224 outputs the second display data to the display unit 210 as the display data for outputting the work process management chart (step S11).

As described above, even when the work process management chart displayed based on the first display data needs to be squeezed in the time axis direction, the process management device 200 according to the present embodiment can generate and display the second display data obtained by squeezing the work process management chart displayed based on the first display data in the time axis direction without crushing the work time lines by inclining each work time line with its length unchanged. Therefore, by checking the work process management chart displayed based on the second display data, whose visibility is not impaired, the manager can assess the production status. Also, it is possible to assist the manager to access the production status and identify the causes preventing the productivity improvement by displaying the work time lines and the conveyance time lines in different formats and/or by adding the discrimination signs to the characteristic parts on the work process management chart.

Figure 12:
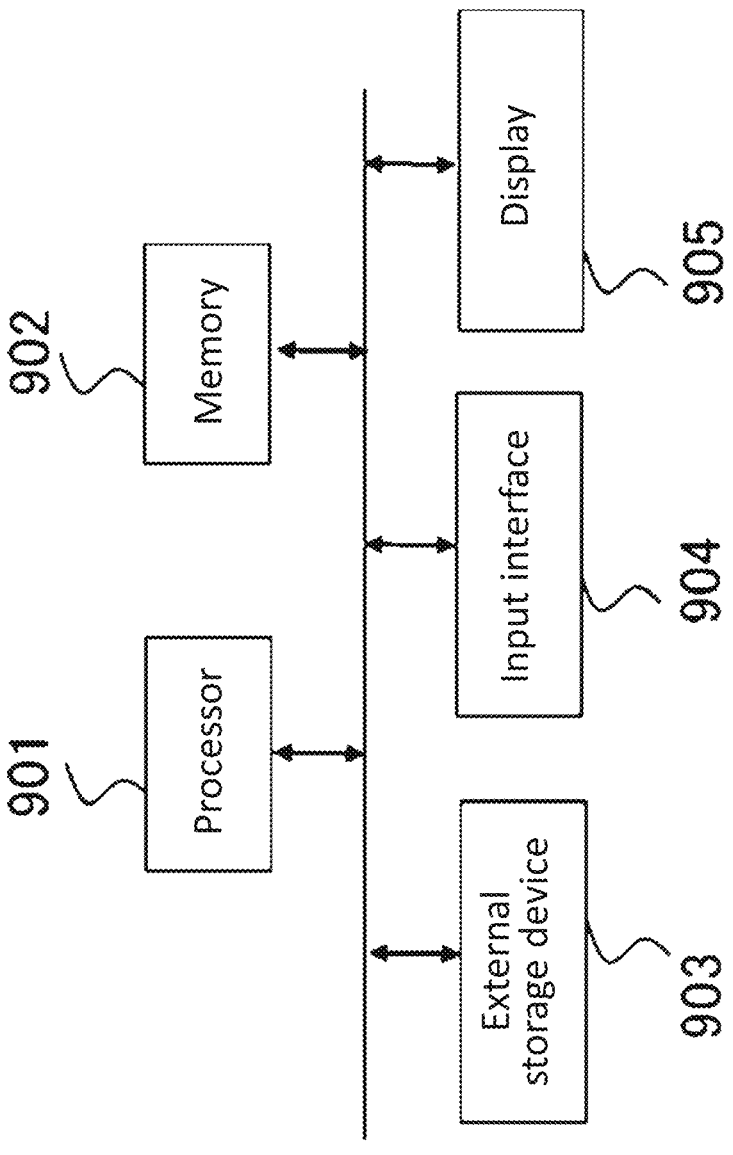
FIG. 12 shows an example of a hardware configuration when functions of the process management device according to Embodiment 1 are realized using a computer system.

Next, a hardware configuration of the process management device 200 according to Embodiment 1 will be described. The functional units of the process management device 200 are realized by using a computer system such as a personal computer and a general-purpose computer. FIG. 12 shows an example of the hardware configuration when the functions of the process management device 200 according to Embodiment 1 are realized using a computer system.

The process management device 200 includes a processor 901 to execute various processes, a memory 902, which is a built-in memory, an external storage device 903 to store various information, an input interface 904 for inputting various information, and a display 905 to display various information.

The processor 901 is a central processing unit (CPU). The processor 901 may be a processing unit, an arithmetic unit, a microprocessor, a microcomputer, or a digital signal processor (DSP). Each function of the control unit 220 is realized by either software, firmware, or a combination of software and firmware to work with the processor 901. The software or the firmware, written as a program, is stored in the external storage device 903. The processor 901 reads out the software or the firmware stored in the external storage device 903 to the memory 902 and executes the software or the firmware.

The memory 902 is a non-volatile or volatile semiconductor memory such as a random access memory (RAM), a read only memory (ROM), a flash memory, an erasable programmable read only memory (EPROM), and an electrically erasable programmable read only memory (EEPROM: a registered trademark). The external storage device 903 is a hard disk drive (HDD) or a solid state drive (SSD). The function of the storage unit 230 is realized using the external storage device 903.

The input interface 904 serves as an interface for the information inputted from the data collection device 300 and the manager. The input interface 904 also includes input devices such as a keyboard, a mouse, and a touch panel. The function of the data input unit 240 is realized using the input interface 904. The function of the display unit 210 is realized using the display 905.

Embodiment 2

In Embodiment 2, a description will be made on a process management device that can facilitate the manager's assessment of the production status by adjusting the representation method of the work process management chart even when the manufacturing process includes parallel processes that perform the same task in parallel. The configuration of the process management device according to Embodiment 2 is the same as that of the process management device 200 according to Embodiment 1, so that the description is omitted.

Figure 14:
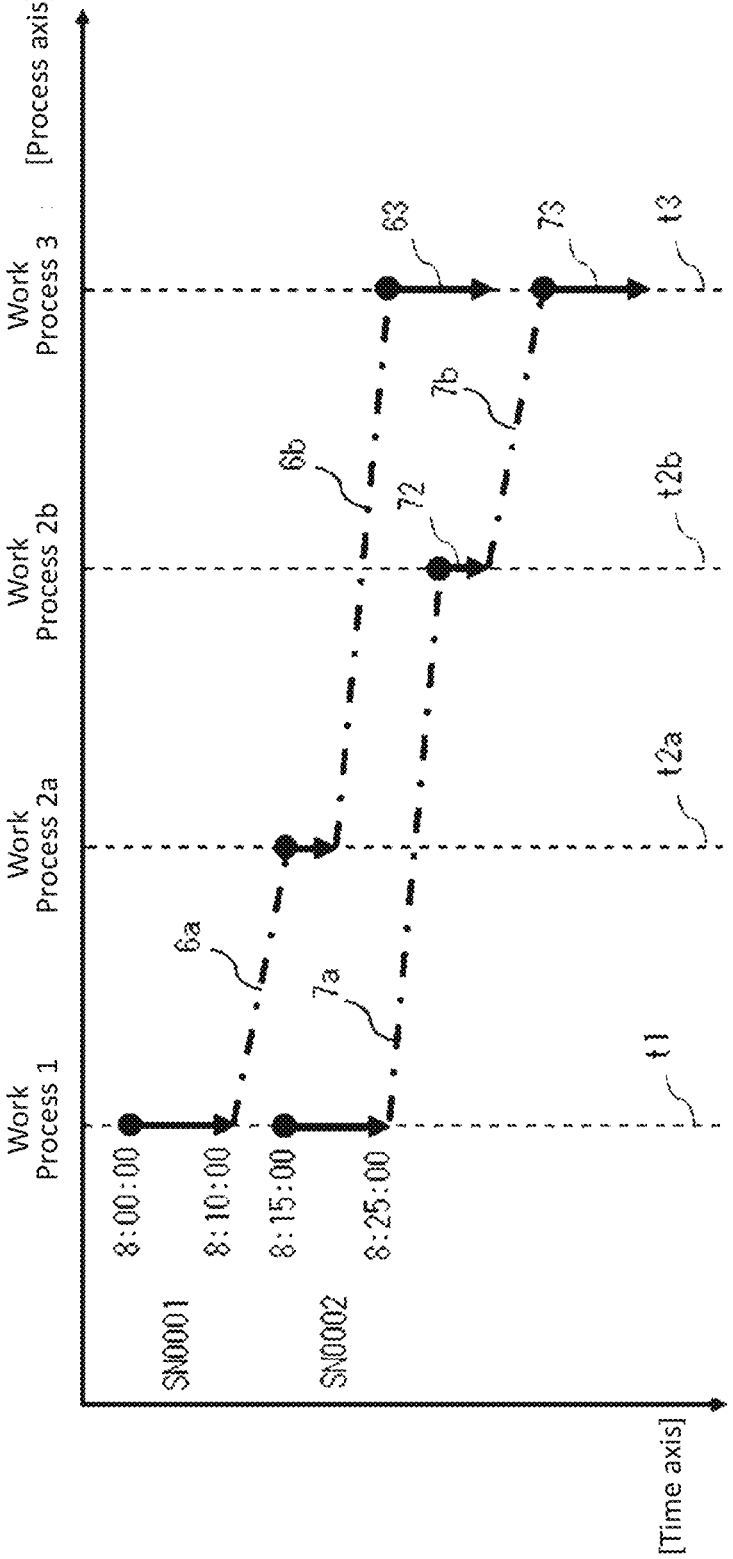
FIG. 14 shows an example of the first display data displayed by a process management device according to Embodiment 2.

If a single production facility lacks production capacity required for a certain work process, the production capacity may be achieved by a plurality of production facilities performing the same task in parallel. As an example, a description will be made on the case where a production facility 2a and a production facility 2b perform the same task in parallel in Work Process 2 as shown in a manufacturing process in FIG. 13. FIG. 14 displays the production status of the manufacturing process as the work process management chart displayed based on the first display data. The display data here is generated by the same method as used to generate the first display data in Embodiment 1, wherein, however, Work Process 2 is separated in the two work processes: Work Process 2a by the production facility 2a and Work Process 2b by the production facility 2b. Note that time axes t2a and t2b are the time axis of Work Process 2a and the time axis of Work Process 2b, respectively.

In the work process management chart displayed based on the first display data like FIG. 14, although no conveyance trouble has occurred between the work processes, the inclinations of a conveyance time line 6b between Work Process 2a and Work Process 3 and a conveyance time line 7a between Work Process 1 and Work Process 2b appear to be seemingly more gradual than the inclinations of conveyance time lines 6a and 7b between other work processes. This prevents the manager who is identifying a cause of a production trouble from making a correct analysis based on the characteristics shown on the work process management chart.

If the production capacity can be satisfied by a single production facility, Work Process 2 can be shown as one work process. In the above example, however, Work Process 2 is separated into the two work processes, namely, Work Process 2a and Work Process 2b. Therefore, when looking at the work process management chart and assessing the production status, the manager ends up seeing Work Process 2a and Work Process 2b as unrelated and separate processes. This prevents the manager from recognizing Work Process 2a and Work Process 2b as a single work process of Work Process 2 and from assessing the production status appropriately.

In such a case, when, for example, the manager's request instruction information with an intention to "change the work process management chart displayed based on the first display data for the manufacturing process including the parallel processes to a work process management chart that is easier to visually recognize" is inputted from the data input unit 240, the connection line adjustment unit 223 analyzes the content of the request instruction information and generates the second display data by adjusting the representation method and making it easier to visually recognize the work process management chart displayed based on the first display data for the manufacturing process including the parallel processes. Specifically, the connection line adjustment unit 223 generates the second display data in which the interval between the time axes of the parallel processes in the work process management chart displayed based on the first display data is squeezed. The processing performed by the connection line adjustment unit 223 at this time will be described.

First, the manager inputs a squeeze ratio of the interval between the time axes of the parallel processes from the data input unit 240 in advance and sets it to the storage unit 230. When the request instruction information is inputted from the data input unit, the connection line adjustment unit 223 analyzes the content of the request instruction information and adjusts the representation method on the basis of the analysis result. If the request instruction information that requests, as in this case, the change of the display to the work process management chart obtained by making it easier to visually recognize the work process management chart displayed based on the first display data is inputted from the data input unit, the following processes are performed.

First, the connection line adjustment unit 223 reads, from the storage unit 230, the scale setting information of the process axis of the work process management chart displayed based on the first display data and the squeeze ratio of the interval between the time axes of the parallel processes, and calculates the interval of the time axes of the parallel processes by multiplying the scale of the process axis of the work process management chart displayed based on the first display data, that is, the interval between the time axes of the work process management chart displayed based on the first display data, by the squeeze ratio of the interval between the time axes of the parallel processes. Next, the connection line adjustment unit 223 changes the scale of the process axis of the work process management chart displayed based on the first display data to the interval of the time axes for parallel processes only for the segment corresponding to the parallel processes, squeezes the process axis only for the segment corresponding to the parallel processes, and generates the process axis of the work process management chart displayed based on the second display data. Next, the connection line adjustment unit 223 translates the work time lines on the work process management chart displayed based on the first display data in the process axis direction in accordance with the scale of the process axis of the work process management chart displayed based on the second display data. For example, in FIG. 14, the work time lines 63, 72, and 73 are to be translated. Then, the connection line adjustment unit 223 generates the second display data by redrawing the conveyance time lines in accordance with the work time lines after the translation such that the connection relationship between each work time line and each conveyance time line on the work process management chart displayed based on the first display data is maintained. The connection line adjustment unit 223 stores the generated second display data in the storage unit 230.

The interval between the time axes for the parallel processes can be optionally set in accordance with the manager's preference so that the work process management chart can be visually recognized with ease. For example, if it is preferred to integrate and show as one axis the time axes of the parallel processes in the work process management chart displayed based on the first display data, the squeeze ratio of the interval between the time axes of the parallel processes should be set to zero. Then, the time axes coincide with each other and appear seemingly as one time axis.

Figure 15:
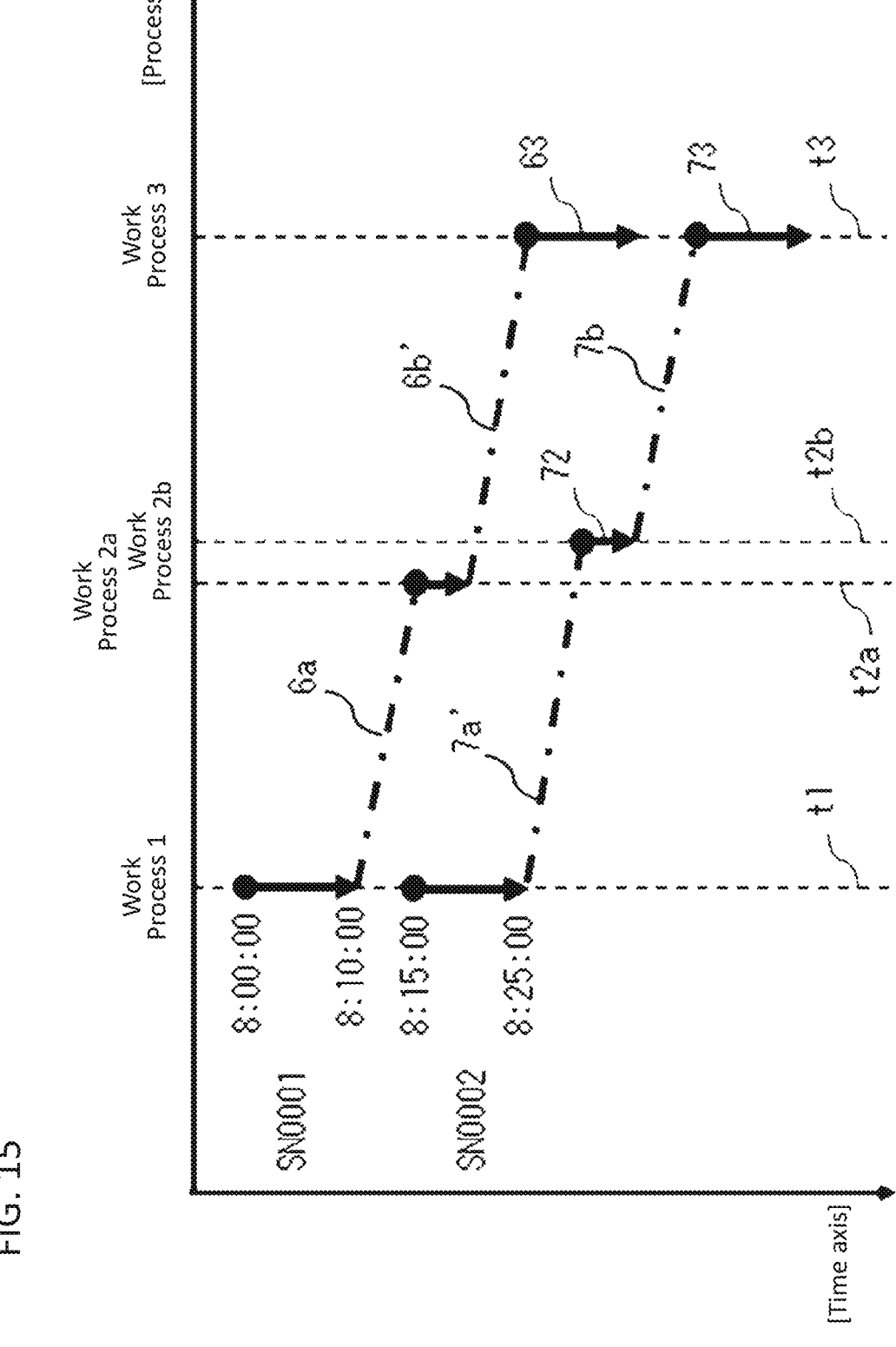
FIG. 15 shows an example of the second display data displayed by the process management device according to Embodiment 2.

FIG. 15 is an example of the work process management chart displayed based on the second display data obtained by making the work process management chart displayed based on the first display data shown in FIG. 14 easy to visually recognize. To obtain this chart, the interval between a time axis t2a of Work Process 2a and a time axis t2b of Work Process 2b are squeezed by the processing described above. The work process management chart displayed based on the second display data shown in FIG. 15 is a work process management chart obtained from the work process management chart displayed based on the first display data shown in FIG. 14 by squeezing the interval between the time axis t2*a* of Work Process 2a and the time axis t2*b* of Work Process 2b. In the work process management chart displayed based on the first display data, the inclinations of the conveyance time line 6*b* between Work Process 2a and Work Process 3 and the conveyance time line 7*a* between Work Process 1and Work Process 2b appear to be seemingly more gradual than the inclinations of the conveyance time lines 6*a* and 7*b* between other work processes. As a result of the above processing, however, in the work process management chart displayed based on the second display data as shown in FIG. 15, the inclinations of a conveyance time line 6*b*' between Work Process 2a and Work Process 3 and a conveyance time line 7*a*' between Work Process 1 and Work Process 2b are equivalent to the inclinations of the conveyance time lines 6*a* and 7*b* between other work processes. Therefore, the manager can perform the appropriate analysis when identifying the causes of a production trouble on the basis of the characteristics of the work process management chart.

Also, in the case of the work process management chart displayed based on the first display data shown in FIG. 14, Work Process 2a and Work Process 2b are visually recognized as unrelated and separate processes, whereas in the case of the work process management chart displayed based on the second display data shown in FIG. 15, Work Process 2a and Work Process 2b are visually recognized as one integrated process. Therefore, this makes it easy to understand Work Process 2a and Work Process 2b as one single Work Process 2 and thus facilitates the assessment of the production status.

Embodiment 3

In Embodiment 3, a description will be made on a process management device that facilitates the manager's recognition of variation in so-called cycle times, which are times taken for the production, by adjusting the representation method of the work process management chart when there are subtle variations in the cycle times in the same work process. The configuration of the process management device according to Embodiment 3 is the same as that of the process management device 200 according to Embodiment 1, so that the description is omitted.

Figure 16:
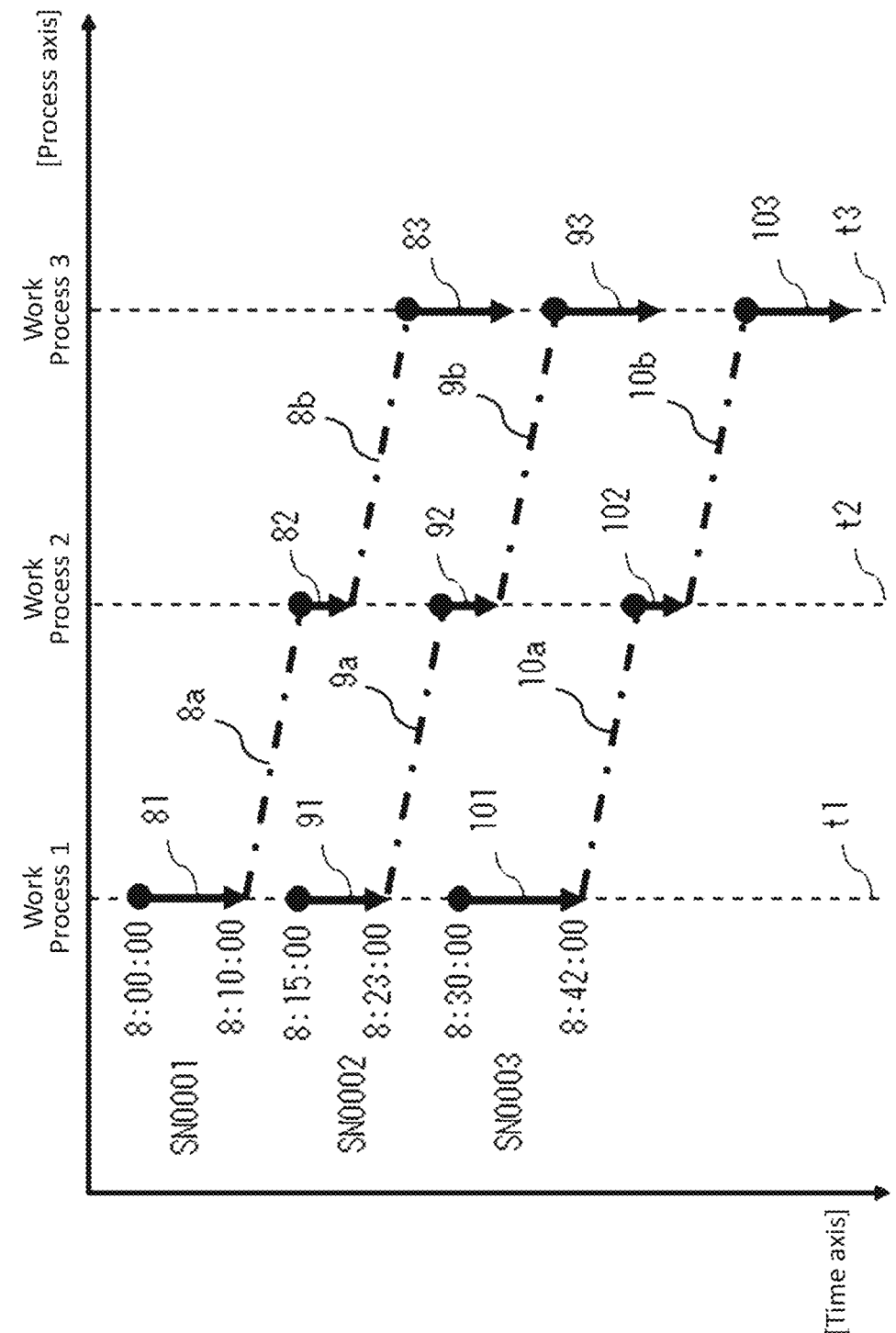
FIG. 16 shows an example of the first display data displayed by a process management device according to Embodiment 3.

FIG. 16 is an example of the work process management chart displayed based on the first display data showing a manufacturing process including three work processes, the chart having been generated by a similar method as used in Embodiment 1. In FIG. 16, the cycle times in Work Process 1 include subtle variations. Even when there are subtle variations in the cycle times in a work process, it is difficult to visually recognize them if the representation method of the work process management chart displayed based on the first display data shown in FIG. 16 is used. In such a case, the process management device 200 according to Embodiment 3 displays the second display data obtained by adjusting the representation method of the work process management chart displayed based on the first display data such that the variations in the cycle times can be visually assessed with ease.

For example, regarding the first display data shown in FIG. 16, when request instruction information with an intention to "change the work process management chart to a work process management chart that is easier to visually recognize the variations in the cycle times in Work Process 1" is inputted from the data input unit, the connection line adjustment unit 223 analyzes the content of the request instruction information and performs the following processes.

Figure 17:
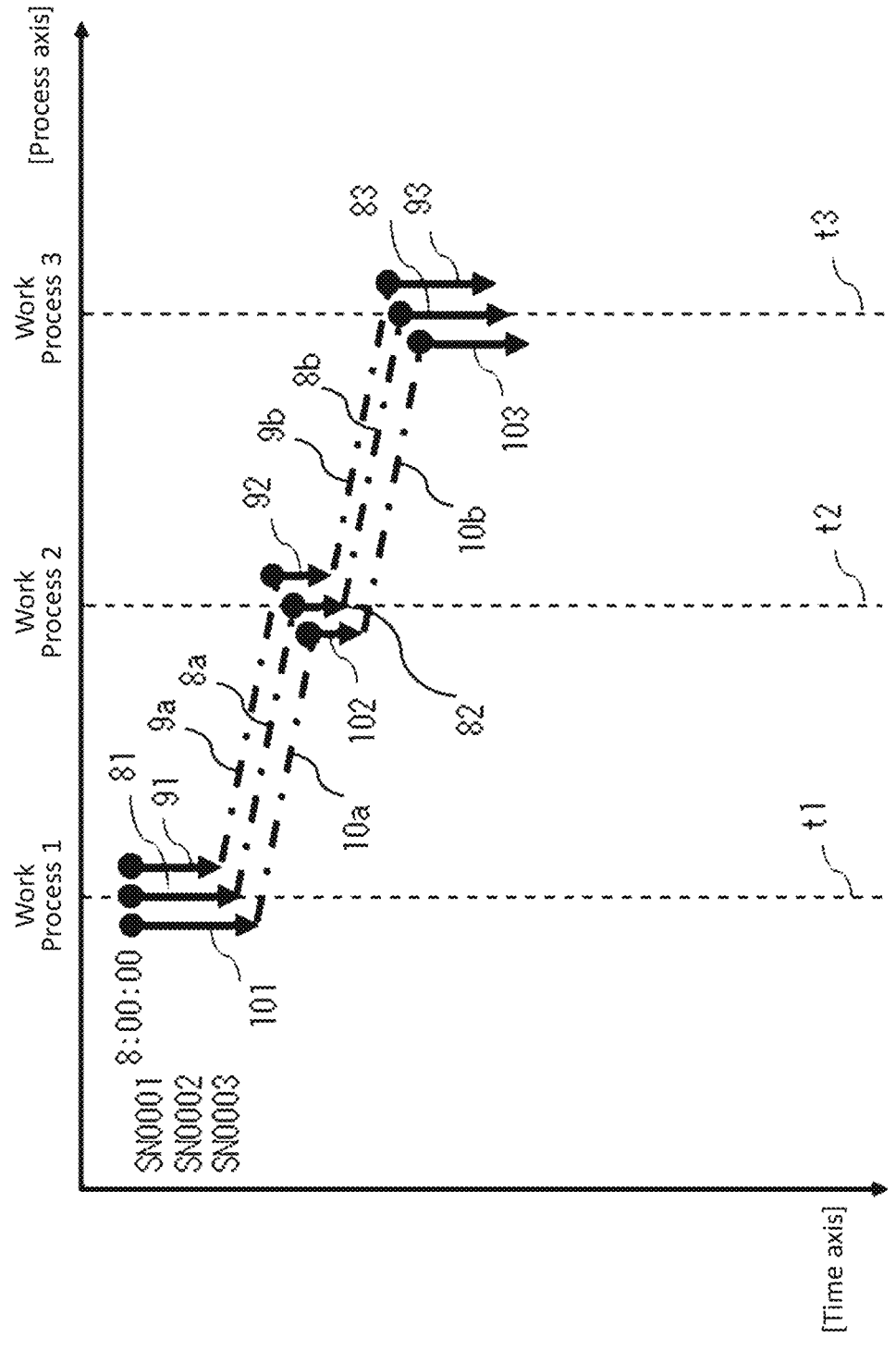
FIG. 17 shows an example of the second display data displayed by the process management device according to Embodiment 3.

First, the connection line adjustment unit 223 translates a work time line 91 of the product number SN0002 in Work Process 1 in the time axis direction such that the position of the first mark of the work time line 91 of the product number SN0002 in Work Process 1 matches the position of the first mark of the work time line 81 of the product number SN0001 in Work Process 1. Next, the connection line adjustment unit 223 translates work time lines 92 and 93 of the product number SN0002 in other work processes in the time axis direction by the time length of the translation of the work time line 91 of the product number SN0002 in Work Process 1 in the time axis direction. Similarly, the connection line adjustment unit 223 translates conveyance time lines 9*a* and 9*b* of the product number SN0002 in the time axis direction by the time length of the translation of the work time line 91 of the product number SN0002 in Work Process 1 in the time axis direction. The connection line adjustment unit 223 performs the same processes for the remaining product number. As a result, the connection line adjustment unit 223 generates the second display data shown in FIG. 17.

Here, the work time lines and the conveyance time lines are translated in accordance with the position of the first mark of the work time line 81 of the product number SN0001 in Work Process 1. However, the work time lines and the conveyance time lines may be translated in accordance with the position of the first mark of the work time line of a product number other than SN0001 in Work Process 1.

As described above, when the request instruction information requesting the change to the work process management chart that is easier to visually recognize the variations in the cycle times in a specific work process among the work processes shown in the work process management chart displayed based on the first display data is inputted, the connection line adjustment unit 223 first translates in the time axis direction each work time line in the specific work process specified in the request instruction information among the work time lines and the conveyance time lines on the work process management chart displayed based on the first display data such that the positions of the first marks of the work time lines in the specific work process specified in the request instruction information match with each other. Then, the second display data is generated by translating in the time axis direction the other work time lines and conveyance time lines in connection with each work time line in the specific work process specified in the request instruction information by the same time length of the translation, in the time axis direction, of each work time line in the specific work process specified in the request instruction information. In other words, the second display data is generated by translating in the time axis direction the other work time lines and conveyance time lines in connection with the same product number as that of each work time line translated in the time axis direction in the specific work process specified in the request instruction information by the same time length of the translation, in the time axis direction, of each work time line in the specific work process specified in the request instruction information.

Here, if a set of the work time lines and the conveyance time lines in connection with each product number is defined as "connection line group", it can be said in another way that the connection line adjustment unit 223 generates the second display data by translating each connection line group on the work process management chart displayed based on the first display data in the time axis direction and overlaying them with each other such that the positions of the first marks of the work time lines in the specific work process specified in the request instruction information match with each other.

As described above, the process management device 200 according to Embodiment 3 can make it easy to visually recognize the variations in the cycle times by overlaying a plurality of the connection line groups such that the positions of the first marks of the work time lines in the specified work process match with each other, so that the manager can easily figure out the variations.

Embodiment 4

In Embodiment 4, a description will be made on a process management device that can visualize the production status of each of a plurality of types of products that are produced in a mixed manner. The configuration of the process management device according to Embodiment 4 is the same as that of the process management device 200 according to Embodiment 1, so that the description is omitted.

Figure 18:
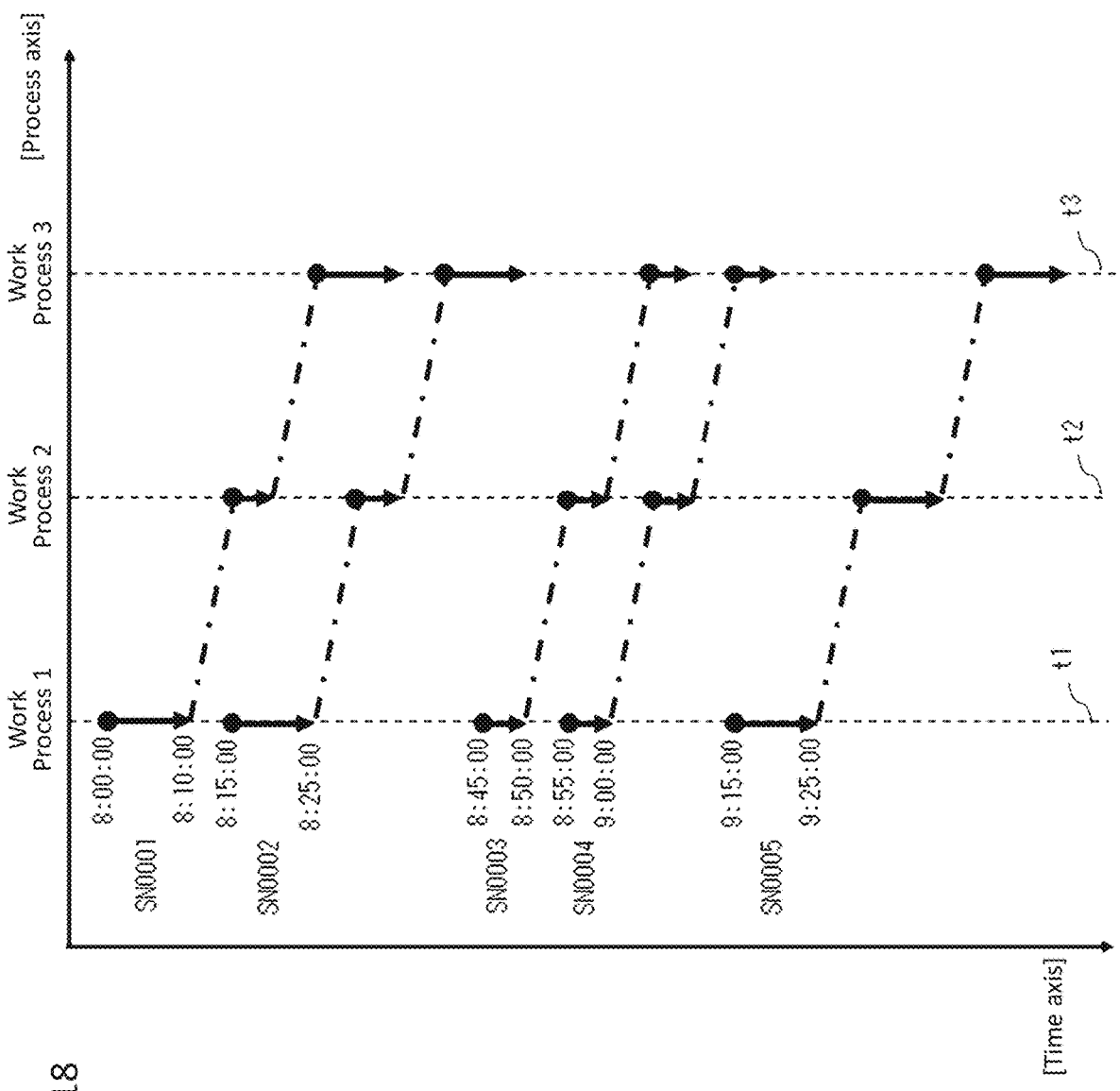
FIG. 18 shows an example of the first display data that a process management device according to Embodiment 4 generated by visualizing, using the same representation method as used in Embodiment 1, a production status when a plurality of types of products are produced in a mixed manner.

FIG. 18 shows an example of the work process management chart displayed based on the first display data generated by visualizing, using the same representation method as used in Embodiment 1, the production status when the plurality of types of products are produced in a mixed manner. Respective connection line groups of the product number SN0001 and SN0002 show a production status when product pieces of product type A are produced; respective connection line groups of the product number SN0003 and SN0004 show a production status when product pieces of product type B are produced; and a connection line group of the product number SN0005 shows a production status when product pieces of product type C is produced. In the case of the work process management chart displayed based on the first display data shown in FIG. 18, it is difficult to visually figure out which connection line group is included in specific connection line groups of the same type of product among the plurality of connection line groups.

Figure 20:
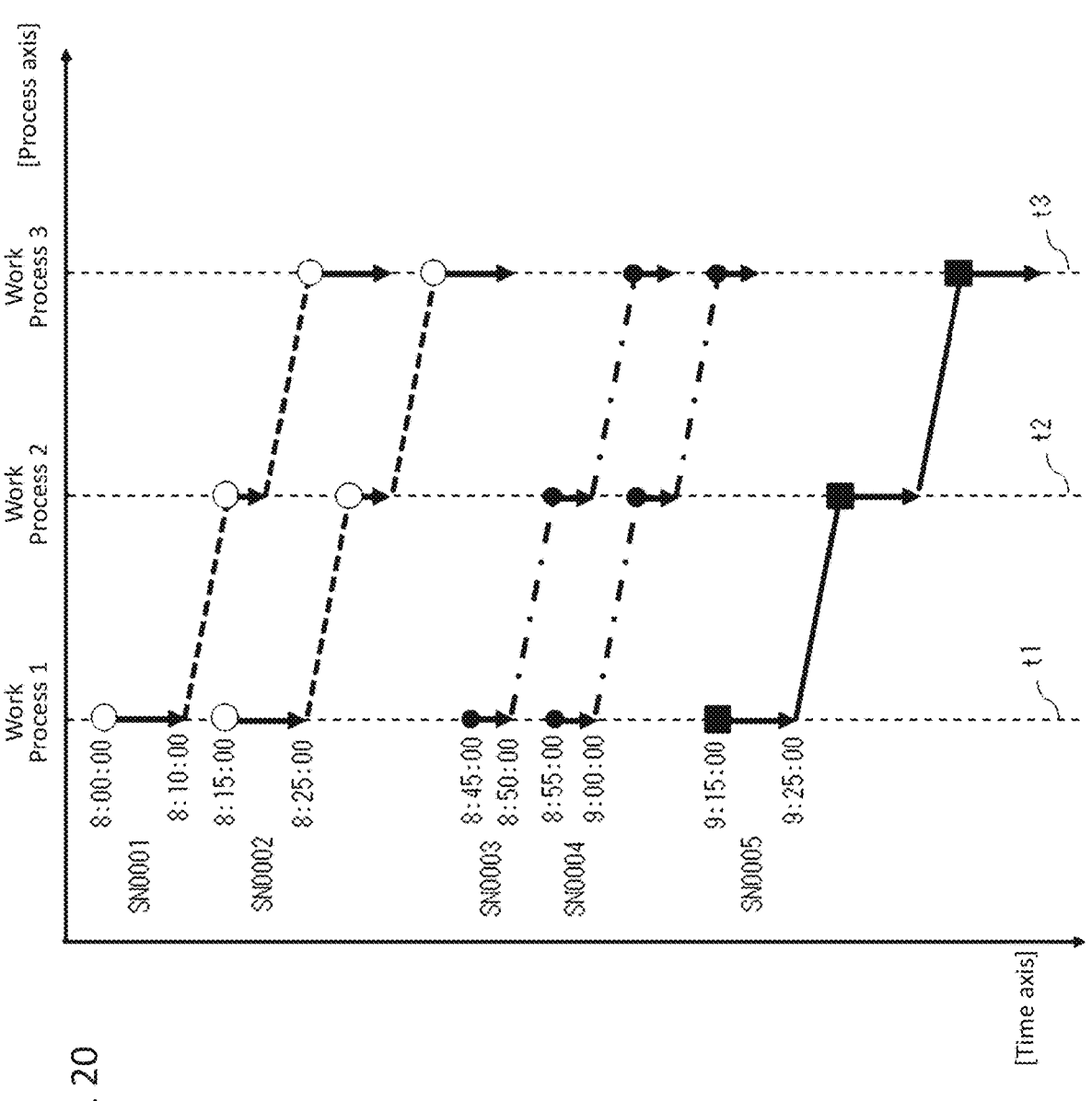
FIG. 20 shows an example of the first display data shown in FIG. 18 after changing the formats of connection lines of the first display data.

FIG. 19 shows an example of the operation data used by the process management device 200 according to Embodiment 4. The operation data shown in FIG. 19 includes product type information added for each of the product numbers. Thus, if the type information of product is added to each of the plurality of product pieces in the operation data, when generating the work time lines and the conveyance time lines, the connection line generation unit 222 changes the formats of the work time lines and the formats of the conveyance time lines on the basis of the product type information and generates the first display data in accordance with the changed work time line formats and the changed conveyance time line formats. That is, the connection line generation unit 222 changes a preset format of the work time line such that the work time lines corresponding to the same product type and the work time lines corresponding to different product types are formatted differently on the basis of the product type information. Also, the connection line generation unit 222 changes a preset format of the conveyance time line such that the conveyance time lines corresponding to the same product type and the conveyance time lines corresponding to different product types are formatted differently. Then, the connection line generation unit 222 generates the first display data in accordance with the changed formats of the work time lines and the conveyance time lines. FIG. 20 shows the work process management chart displayed based on the first display data generated by the connection line generation unit 222 as a result of these processes.

In the work process management chart displayed based on the first display data shown in FIG. 20, as for the product type A, the format of the first mark of the work time line is changed from ● to ○ and the format of the conveyance time line is changed from dashed and dotted line to dotted line. As for the product type C, the format of the first mark of the work time line is changed from ● to ■ and the format of the conveyance time line is changed from dashed and dotted line to solid line. The work process management chart shown in FIG. 20 based on the first display data is an example, and the color, for example, of the work time lines and the conveyance time lines may be changed. In the following processes, it is possible to generate the second display data from the first display data in the same method as described in the embodiments above.

This makes it possible for the manager to visually assess the production status for each type of product. If the formats applied to the connection line groups are different between a first connection line group and the following connection line group among the plurality of connection line groups, it is indicated that there is a setup to change the product types to be manufactured within the production waiting time between the first connection line group and the following connection line group. Therefore, the manager can easily figure out a setup point that occurs when changing product types. Therefore, if the production waiting time between the first connection line group and the following connection line group is longer than expected, it can be presumed that some problem has occurred in the setup to change the type of product.

Embodiment 5

In Embodiments 1 through 4, the descriptions are made on the process management devices that display the work process management charts visualizing the status of the production in the past. Meanwhile, there is a case where a number of products of the same product type are manufactured by repeating the work processes. In Embodiment 5, a description will be made on a process management device that can display, in such a case, the work process management chart obtained by predicting and visualizing the production status after the time when the operation data was acquired from each production facility. That is, when a number of product pieces to be manufactured through each of the work processes are all of the same product type, the process management device according to Embodiment 5 visualizes the production status of the product pieces including the production status after the time when the operation data was acquired from each production facility as the work process management chart. The same parts as in Embodiment 1 are omitted from the description and the parts that differ from those in Embodiment 1 will be described.

Figure 21:
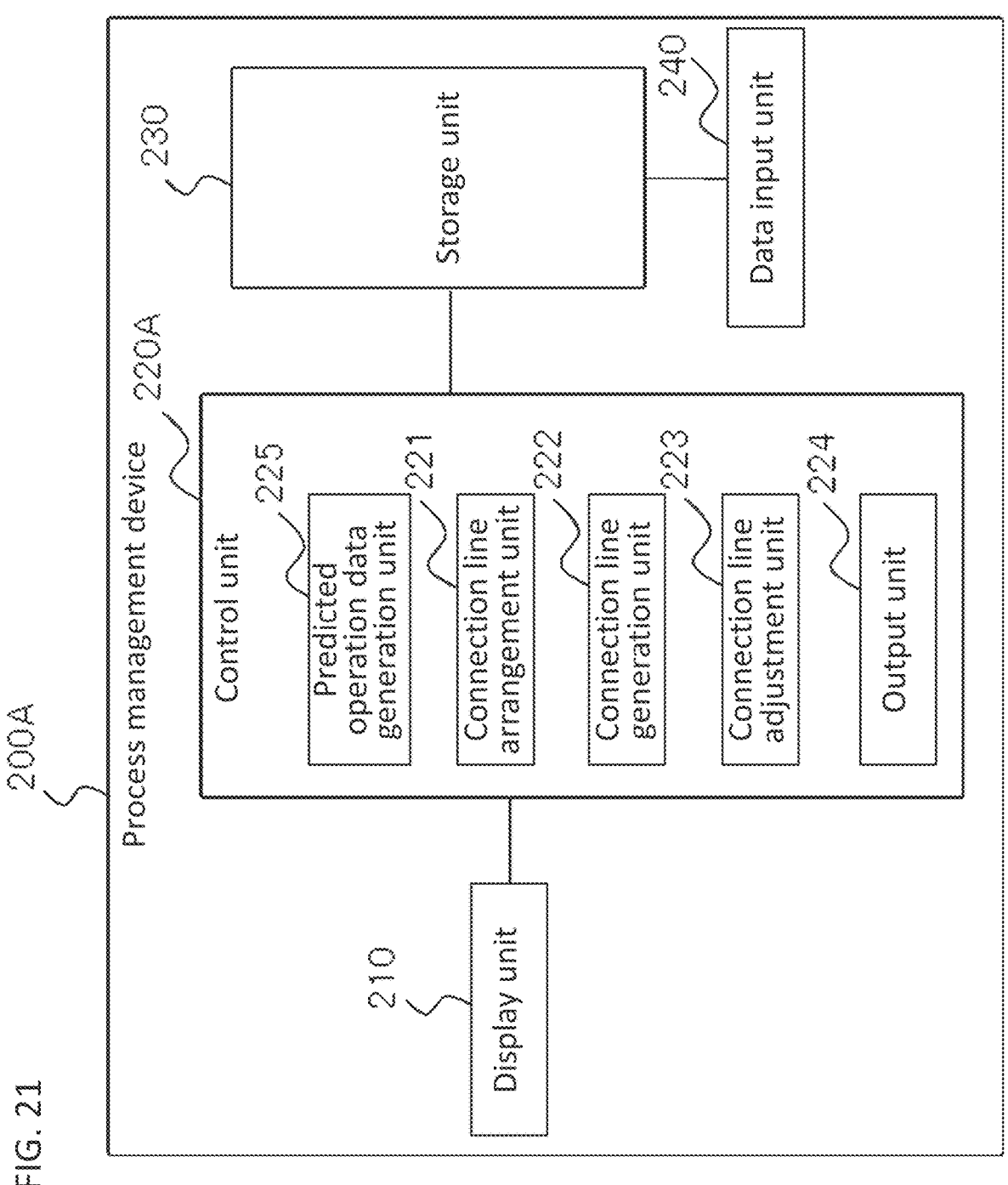
FIG. 21 shows a configuration of a process management device according to Embodiment 5.

FIG. 21 shows a configuration of a process management device 200A according to Embodiment 5. The process management device 200A according to Embodiment 5 further includes a predicted operation data generation unit 225 that generates predicted values for the operation data after the time when the operation data was acquired from each production facility (hereinafter referred to as "predicted operation data") in addition to the configuration of the process management device 200 according to Embodiment 1.

When request instruction information requesting the work process management chart obtained by predicting and visualizing the production status after the time when the operation data was acquired is inputted from the data input unit 240, the predicted operation data generation unit 225 analyzes the work times and the production waiting times in each work process from the operation data stored in the storage unit 230, and generates the predicted operation data on the basis of the work times and the production waiting times analyzed for each work process and the number of the products designated in advance in the production plan.

When product pieces of the same product type are produced repeatedly through each work process, it is expected that the production will be continued at the same pace in the work time and the production waiting time in each work process even after the time when the operation data was acquired from each production facility. Therefore, specifically, the predicted operation data generation unit 225 first calculates an analysis value of the work time and an analysis value of the production waiting time for each work process from the operation data acquired up to now from each production facility. The analysis values of the work times and the analysis values of the production waiting times may be calculated, for example, on the basis of data distribution of the work times as the population and data distribution of the production waiting times as the population both extracted from the operation data acquired up to now from each production facility.

Meanwhile, the work times and the production waiting times are likely to be constant in normal operation, and become longer only when an irregular event such as a production trouble occurs. Therefore, the constant work times and the constant production waiting times calculated by removing the data that is presumed to be in connection with an irregular event such as a production trouble from the data of the work times and the production waiting times extracted from the operation data acquired up to now from each production facility may be determined as the analysis values of the work times and the analysis values of the production waiting times, respectively.

Next, the predicted operation data generation unit 225 calculates, on the basis of the analysis value of the work time and the analysis value of the production waiting time in each work process and the number of the products designated in advance in the production plan, the predicted value of the work start time and the predicted value of the work end time in each work process after the time when the operation data was acquired from each production facility to generate the predicted operation data. Specifically, the predicted operation data generation unit 225 calculates the predicted values of the work start times and the predicted values of the work end times in each work process after the time when the operation data was acquired from each production facility by cumulating, on the operation data acquired up to now from each production facility, the analysis values of the work times and the analysis values of the production waiting times for each work process in order by the number of the products designated in the production plan, thereby generating the predicted operation data.

If it is found that the work time and/or the production waiting time tends to delay as a result of the analysis based on the operation data acquired up to now from each production facility with regard to the trends of the work times and the production waiting times in each work process, the predicted operation data generation unit 225 may add delay times as correction values in calculating the predicted value of the work start time and the predicted value of the work end time in each work process after the time when the operation data was acquired from each production facility, thereby generating the predicted operation data.

After generating the predicted operation data, the predicted operation data generation unit 225 stores it in the storage unit 230. When request instruction information requesting the work process management chart obtained by predicting and visualizing the production status after the time when the operation data was acquired is inputted from the data input unit 240, the connection line arrangement unit 221 generates the connection line arrangement data on the basis of the operation data obtained by adding the predicted operation data to the operation data acquired up to now from each production facility. Then, the first display data or the second display data is generated by the same method as used in Embodiment 1. When generating the work time lines and the conveyance time lines, the connection line generation unit 222 may change the formats of the work time lines and the conveyance time lines between before and after the time desired by the manager such as the current time when the operation data is acquired from each production facility and a usual closing time, to display them such that the manager can assess the production status with ease.

Figure 22:
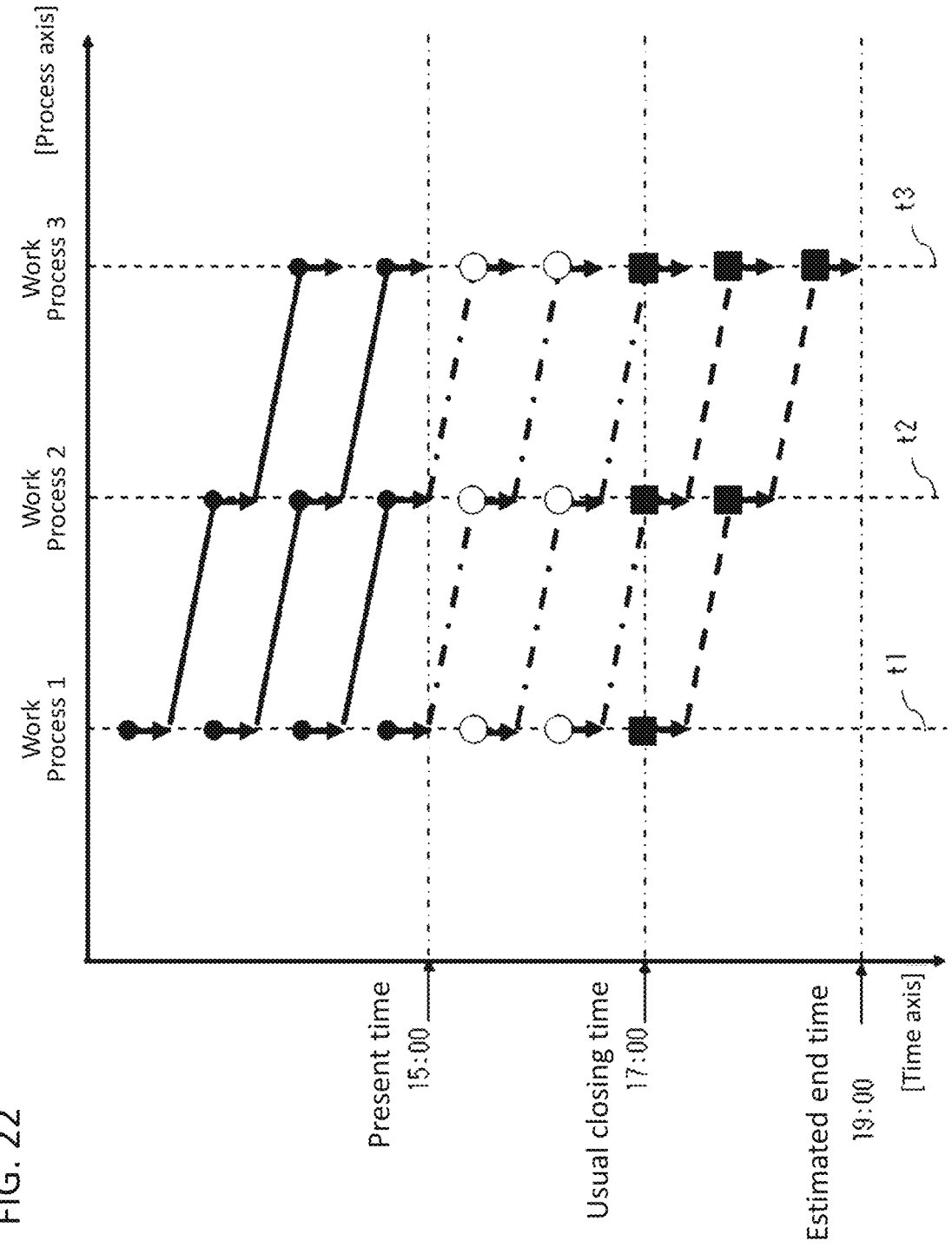
FIG. 22 shows an example of the first display data generated by the process management device according to Embodiment 5.

FIG. 22 shows an example of the work process management chart displayed based on the first display data generated by the process management device 200A as a result of these processes. From the work process management chart shown in FIG. 22, the manager can predict the number of products produced by the usual closing time as well as the estimated end time when the production of the number of products designated in advance in the production plan will be completed.

As described above, the process management device 200A according to the present embodiment can predict and display the production status after the present time from the operation data acquired up to now from each production facility, so that the manager can determine earlier whether overtime work or holiday work is required.

The configurations shown in the embodiments above, which are examples of the contents of present disclosure, can be combined with another known technology or omitted/changed in part within the scope of the gist of the present disclosure.

DESCRIPTION OF SYMBOLS 11, 12, 13, 14, 23, 33, 43, 53, 63, 72, 73, 81, 82, 83, 91, 92, 93, 101, 102, 103 . . . work time line
1a, 1c, 2c, 3b, 3c, 4b, 4c, 5c, 6a, 6b, 6b', 7a, 7a', 7b, 8a, 8b, 9a, 9b, 10a, 10b . . . conveyance time line
200, 200A . . . process management device
210 . . . display unit
220, 220A . . . control unit
221 . . . connection line arrangement unit
222 . . . connection line generation unit
223 . . . connection line adjustment unit
224 . . . output unit
225 . . . predicted operation data generation unit
230 . . . storage unit
240 . . . data input unit
300 . . . data collection device
400 . . . production facility
901 . . . processor
902 . . . memory

903 . . . external storage device
904 . . . input interface
905 . . . display
t1, t2, t2a, t2b, t3, t4 . . . time axis
The invention claimed is:

1. A process management device that visualizes a production status of a plurality of product pieces being manufactured through multiple work processes using a work process management chart of a two-dimensional coordinate system including a time axis representing work time in each work process and a process axis representing transition of the work processes, the process management device comprising:

an input interface to receive various acquired information including operation data of a production facility corresponding to each of the work processes as well as request instruction information from a manager;

a controller to output, as display data for outputting, first display data being the display data of the work process management chart which includes work time lines showing work times in each of the work processes by length and conveyance time lines showing conveyance times in each conveyance process by inclination, both lines being arranged on the process management chart on the basis of the operation data, and serves as display data of the work process management chart to be used for reference, and when the request instruction information for the first display data is inputted from the input interface, to output, as the display data for outputting, second display data being display data of the work process management chart obtained by visualizing the production status visualized by the first display data, on the basis of the request instruction information, with a representation method of the work process management chart different from the representation method of the work process management chart displayed based on the first display data; and a display to display the display data for outputting, wherein the controller comprises:

a processor to execute a program; and a memory to store the program which, when executed by the processor, performs processes of, extracting, from the operation data, a work start time that is a time when processing is started and a work end time that is a time when processing is completed in each of the work processes for each product piece and to generate connection line arrangement data that is display data obtained by arranging a first mark representing the work start time and a second mark representing the work end time in each of the work processes at their respective coordinate positions on the work process management chart, generating, for each of the plurality of product pieces, the first display data by drawing, on the basis of the connection line arrangement data, a work time line connecting the first mark and the second mark of one piece of product, both marks being arranged on each time axis of a first work process and a second work process following the first work process among the multiple work processes and by drawing, on the basis of the connection line arrangement data, a conveyance time line connecting the second mark in the first work process and the first mark in the second work process for the one piece of product, generating, when the request instruction information for the first display data is inputted from the input interface, the second display data by adjusting the representation method of the work process management chart displayed based on the first display data in accordance with the request instruction information, and outputting the first display data as the display data for outputting while the request instruction information for the first display data is not inputted from the input interface and outputting the second display data as the display data for outputting when the request instruction information for the first display data is inputted from the input interface, wherein a characteristic value of a characteristic part is extracted as a judgment index on whether the production status is good or bad from the work process management chart displayed based on the first display data or the second display data and, as the display data for outputting, the display data of the work process management chart with a discrimination sign for assisting assessment of the production status added is outputted, on the basis of an allowable value predetermined for each characteristic value, to the characteristic part of the work process management chart displayed based on the first display data or the second display data.

2. The process management device according to claim 1, wherein, when the request instruction information requesting to change the work process management chart displayed based on the first display data to a work process management chart obtained by squeezing the work process management chart displayed based on the first display data in a time axis direction by a designated squeeze ratio is inputted from the input interface, the program performs processes of:

generating a coordinate system of the work process management chart displayed based on the second display data by squeezing a coordinate system of the work process management chart displayed based on the first display data in the time axis direction by the squeeze ratio; generating work time lines obtained by inclining, in accordance with the squeeze ratio, the work time lines on the work process management chart displayed based on the first display data toward a direction of the process axis with their respective lengths unchanged; translating the inclined work time lines in the time axis direction such that the positions of the first marks of the inclined work time lines match the respective work start times corresponding to the inclined work time lines in a scale of the time axis of the coordinate system of the work process management chart displayed based on the second display data; and redrawing, in accordance with the inclined work time lines after the translation, the conveyance time lines such that a connection relationship between each work time line and each conveyance time line on the work process management chart displayed based on the first display data is maintained, thereby generating the second display data.

3. The process management device according to claim 1, wherein, in a case where parallel processes that perform the same task in parallel are included in the multiple work processes and when the request instruction information requesting a change to a work process management chart obtained by making the work process management chart displayed based on the first display data easier to visually recognize is inputted from the input interface, the program performs processes of: generating a coordinate system of the work process management chart displayed based on the second display data by squeezing the process axis of the work process management chart displayed based on the first display data only for a segment corresponding to the parallel processes; translating, in accordance with the coordinate system, the work time lines on the work process management chart displayed based on the first display data in the process axis direction of the coordinate system; and then, redrawing, in accordance with the work time lines, the work conveyance time lines such that a connection relationship between each work time line and each conveyance time line on the work process management chart displayed based on the first display data is maintained, thereby generating the second display data.

4. The process management device according to claim 1, wherein, when the request instruction information requesting a change to a work process management chart obtained by making variations in cycle times in a specific work process among the work processes in the work process management chart displayed based on the first display data easier to visually recognize is inputted from the input interface, the program performs processes of: translating, in a time axis direction, the work time lines in the specific work process among the work time lines and the conveyance time lines on the work process management chart displayed based on the first display data such that the positions of the first marks of the work time lines in the specific work process match with each other; and translating, in the time axis direction, other work time lines and other conveyance time lines that are in connection with the work time lines in the specific work process by the same time length of the translation, in the time axis direction, of the work time lines in the specific work process, thereby generating the second display data.

5. The process management device according to claim 1, wherein the program generates the work time lines and the conveyance time lines in accordance with a format of the work time lines and a format of the conveyance time lines set in advance.

6. The process management device according to claim 5, wherein, in a case where product type information is added to each of the plurality of product pieces in the operation data, when generating the work time lines and the conveyance time lines, the program changes the format of the work time lines and the format of the conveyance time lines on the basis of the product type information of the product pieces and generates the first display data in accordance with the changed formats of the work time lines and the changed formats of the conveyance time lines.

7. The process management device according to claim 1, wherein the program further analyzes the work times and the production waiting times in each work process on the basis of the operation data, calculates an analysis value of the work times in each work process and an analysis value of the production waiting times in each work process, and generates predicted operation data that is a predicted value of the operation data after the time when the operation data is acquired on the basis of the analysis value of the work times in each of the work processes, the analysis value of the production waiting times in each of the work processes, and the number of the product pieces designated in advance in a production plan, and in a case where the plurality of product pieces are all of the same product type, and when the request instruction information requesting a work process management chart obtained by predicting and visualizing the production status after the time when the operation data is acquired is inputted from the input interface, generates the connection line arrangement data on the basis of the operation data obtained by adding the predicted operation data to the operation data.

8. A process management method that visualizes a production status of a plurality of product pieces being manufactured through multiple work processes using a work process management chart of a two-dimensional coordinate system including a time axis representing work time in each work process and a process axis representing transition of the work processes, the process management method comprising:

receiving various acquired information including operation data of a production facility corresponding to each of the work processes as well as request instruction information from a manager;

extracting, from the operation data, a work start time that is a time when processing is started and a work end time that is a time when processing is completed in each of the work processes for each product piece and generating connection line arrangement data that is display data obtained by arranging a first mark representing the work start time and a second mark representing the work end time in each of the work processes at their respective coordinate positions on the work process management chart;

generating, for each of the plurality of product pieces, first display data by drawing, on the basis of the connection line arrangement data, a work time line connecting the first mark and the second mark of one piece of product, both marks being arranged on each time axis of a first work process and a second work process following the first work process among the multiple work processes and by drawing, on the basis of the connection line arrangement data, a conveyance time line connecting the second mark in the first work process and the first mark in the second work process for the one piece of product;

adjusting, when the request instruction information for the first display data is inputted, a representation method of the work process management chart displayed based on the first display data in accordance with the request instruction information and thus generating second display data being the display data of the work process management chart obtained by visualizing the work process management chart with the adjusted representation method of the work process management chart different from the representation method of the work process management chart displayed based on the first display data; and outputting the first display data as the display data for outputting while the request instruction information for the first display data is not inputted and outputting the second display data as the display data for outputting when the request instruction information for the first display data is inputted, wherein a characteristic value of a characteristic part is extracted as a judgment index on whether the production status is good or bad from the work process management chart displayed based on the first display data or the second display data and, as the display data for outputting, the display data of the work process management chart with a discrimination sign for assisting assessment of the production status added is outputted, on the basis of an allowable value predetermined for each characteristic value, to the characteristic part of the work process management chart displayed based on the first display data or the second display data.

9. A non-transitory storage medium storing a program to make a computer execute processes for visualizing a production status of a plurality of product pieces being manu-factured through multiple work processes using a work process management chart of a two-dimensional coordinate system including a time axis representing work time in each work process and a process axis representing transition of the work processes, the processes comprising:

receiving various acquired information including operation data of a production facility corresponding to each of the work processes as well as request instruction information from a manager;

extracting, from the operation data of the production facility corresponding to each of the work processes, a work start time that is a time when processing is started and a work end time that is a time when processing is completed in each of the work processes for each product piece and generating connection line arrangement data that is display data obtained by arranging a first mark representing the work start time and a second mark representing the work end time in each of the work processes at their respective coordinate positions on the work process management chart;

generating, for each of the plurality of product pieces, first display data by drawing, on the basis of the connection line arrangement data, a work time line connecting the first mark and the second mark of one piece of product, both marks being arranged on each time axis of a first work process and a second work process following the first work process among the multiple work processes and by drawing, on the basis of the connection line arrangement data, a conveyance time line connecting the second mark in the first work process and the first mark in the second work process for the one piece of product;

adjusting, when the manager's request instruction information for the first display data is inputted, a representation method of the work process management chart displayed based on the first display data in accordance with the request instruction information and thus generating second display data being the display data of the work process management chart obtained by visualizing the work process management chart with the adjusted representation method of the work process management chart different from the representation method of the work process management chart displayed based on the first display data; and outputting the first display data as the display data for outputting while the request instruction information for the first display data is not inputted and outputting the second display data as the display data for outputting when the request instruction information for the first display data is inputted, wherein a characteristic value of a characteristic part is extracted as a judgment index on whether the production status is good or bad from the work process management chart displayed based on the first display data or the second display data and, as the display data for outputting, the display data of the work process management chart with a discrimination sign for assisting assessment of the production status added is outputted, on the basis of an allowable value predetermined for each characteristic value, to the characteristic part of the work process management chart displayed based on the first display data or the second display data.

* * * * *